(12) United States Patent
Rathburn et al.

(10) Patent No.: US 8,701,136 B2
(45) Date of Patent: Apr. 15, 2014

(54) METHODS AND APPARATUS TO MONITOR, VERIFY, AND RATE THE PERFORMANCE OF AIRINGS OF COMMERCIALS

(75) Inventors: James Milton Rathburn, Hackensack, NJ (US); Laurence Blair Miller, Marina Del Rey, CA (US); Thomas J. Whymark, Bethlehem, PA (US); Huaiyeu Huey Yu, Branchburg, NJ (US); Hui-Tung Yang, Berkeley Heights, NJ (US); Stephen Shindle, Scotch Plains, NJ (US); Jonathan Chazen, Demarest, NJ (US); Joseph Kaminski, Denville, NJ (US)

(73) Assignee: Nielsen Company (US), LLC, Schaumburg, IL (US)

( * ) Notice: Subject to any disclaimer, the term of this patent is extended or adjusted under 35 U.S.C. 154(b) by 1029 days.

(21) Appl. No.: 12/350,223

(22) Filed: Jan. 7, 2009

(65) Prior Publication Data
US 2009/0187932 A1 Jul. 23, 2009

Related U.S. Application Data

(60) Provisional application No. 61/019,501, filed on Jan. 7, 2008.

(51) Int. Cl.
*H04H 20/14* (2008.01)
(52) U.S. Cl.
USPC .................. 725/22; 725/32; 725/34; 725/35; 725/36
(58) Field of Classification Search
USPC .................................... 725/22, 32, 34, 35, 36
See application file for complete search history.

(56) References Cited

U.S. PATENT DOCUMENTS

| | | |
|---|---|---|
| 2,881,244 A | 4/1959 | Pawley et al. |
| 3,845,391 A | 10/1974 | Crosby |
| 4,025,851 A | 5/1977 | Haselwood et al. |
| 4,079,419 A | 3/1978 | Siegle et al. |
| 4,230,990 A | 10/1980 | Lert, Jr. et al. |
| 4,313,197 A | 1/1982 | Maxemchuk |
| 4,425,661 A | 1/1984 | Moses et al. |
| 4,547,804 A | 10/1985 | Greenberg |
| 4,677,466 A | 6/1987 | Lert, Jr. et al. |
| 4,805,020 A | 2/1989 | Greenberg |
| 4,945,412 A | 7/1990 | Kramer |
| 4,967,273 A | 10/1990 | Greenberg |
| 5,216,515 A | 6/1993 | Steele et al. |
| 5,450,490 A | 9/1995 | Jensen et al. |

(Continued)

OTHER PUBLICATIONS

Fletcher, John C., "Teleproof 2: The Technology," pp. 155-157, Journal of the SMPTE published by the Society of Motion Picture and Television Engineers, vol. 84, Mar. 1975 (3 pages).

*Primary Examiner* — Pankaj Kumar
*Assistant Examiner* — Timothy Newlin
(74) *Attorney, Agent, or Firm* — Hanley, Flight and Zimmerman, LLC

(57) ABSTRACT

Methods and apparatus to monitor, verify, and rate the performance of airings of commercials are disclosed. An example method includes receiving an identification of an advertisement that was presented on a media presentation channel at a time, receiving ratings information for the media presentation channel associated with the time period, identifying a buy order for the received identification, receiving a purchased ratings value associated with the buy order, comparing the purchased ratings value to the ratings information, and displaying an indication of whether the ratings information is less than the purchased ratings value.

21 Claims, 34 Drawing Sheets

(56) References Cited

U.S. PATENT DOCUMENTS

| | | |
|---|---|---|
| 5,579,124 A | 11/1996 | Aijala et al. |
| 5,652,615 A | 7/1997 | Bryant et al. |
| 5,719,937 A | 2/1998 | Warren et al. |
| 5,774,170 A | 6/1998 | Hite et al. |
| 5,774,452 A | 6/1998 | Wolosewicz |
| 5,787,334 A | 7/1998 | Fardeau et al. |
| 5,822,360 A | 10/1998 | Lee et al. |
| 5,826,165 A | 10/1998 | Echeita et al. |
| 6,075,551 A | 6/2000 | Berezowski et al. |
| 6,295,092 B1 * | 9/2001 | Hullinger et al. ............. 348/468 |
| 6,338,043 B1 | 1/2002 | Miller |
| 6,353,929 B1 | 3/2002 | Houston |
| 6,799,326 B2 | 9/2004 | Boylan, III et al. |
| 6,985,882 B1 * | 1/2006 | Del Sesto ........................ 705/37 |
| 7,039,931 B2 | 5/2006 | Whymark |
| 7,222,099 B2 | 5/2007 | Forsythe et al. |
| 2002/0059578 A1 | 5/2002 | Nishiura |
| 2002/0178445 A1 | 11/2002 | Eldering et al. |
| 2003/0070167 A1 * | 4/2003 | Holtz et al. ...................... 725/32 |
| 2003/0101454 A1 * | 5/2003 | Ozer et al. ...................... 725/42 |
| 2004/0024633 A1 | 2/2004 | Whymark |
| 2004/0025177 A1 | 2/2004 | Whymark |
| 2004/0216157 A1 * | 10/2004 | Shain et al. ..................... 725/42 |
| 2005/0015796 A1 * | 1/2005 | Bruckner et al. ............... 725/32 |
| 2005/0193411 A1 * | 9/2005 | Funston .......................... 725/36 |
| 2005/0283795 A1 | 12/2005 | Steelberg et al. |
| 2005/0289583 A1 | 12/2005 | Chiu |
| 2006/0031111 A9 | 2/2006 | Whymark |
| 2007/0016918 A1 | 1/2007 | Alcorn et al. |
| 2007/0039018 A1 | 2/2007 | Saslow et al. |
| 2008/0022301 A1 * | 1/2008 | Aloizos .......................... 725/34 |
| 2009/0094631 A1 | 4/2009 | Whymark et al. |

* cited by examiner

| Agency | Advertiser/Products | Users |

WPP Mindshare ▶

Add Advertisers & Product or Edit:

| Adv. Code | Advertiser | Product Code | Product | KeepingTrac Activation | |
|---|---|---|---|---|---|
| | | | | Start | End |
| AMEX | American Express (3 products) | GLD | Gold Card | 10/1/06 | 9/30/07 |
| | | PLT | Platnum Card | 8/15/06 | 8/14/07 |
| | | TRVL | Travel Card | 9/15/06 | 9/14/07 |
| CHV | Chevrolet (3 products) | CHEV | Chevette | 9/22/06 | 9/21/07 |
| | | IMP | Impala | 9/22/06 | 9/21/07 |
| | | MAL | Malibu | 9/29/06 | 9/28/07 |
| KRFT | Kraft, Inc (2 products) | GN | Grape Nuts | | |
| | | SC | Sugar Crisp | 10/1/06 | 9/30/07 |
| PRMT | Paramount (3 products) | DAVC | Davinci Code | | |
| | | ICE2 | Ice Age II | | |
| | | IM3 | Mission Impossible III | | |
| SFC | Six Flags Corporation (4 products) | GEOG | SF Georgia | | |
| | | GRAM | SF Great America | 7/3/06 | 7/2/07 |
| | | MGIC | SF Magic Mountain | 7/3/06 | 7/2/07 |
| | | TEXS | SF Texas | | |

| Add New Advertiser & Products | Add New Products | Deactivate | Print |

| Agency | Advertiser/Products | | | | | | | | | | | |
|---|---|---|---|---|---|---|---|---|---|---|---|---|
| Agency: Mindshare ▼ | | | | | | | | Spot TV Medium | | National Medium | |
| Name | Name | E-Mail | Phone | Title | Advertiser | Products | Spot Mkts | Screen Access | Medium | Screen Access |
| Steve | Shindle | bmiller@aol.com | (310) 348-1510 | Supervisor | CHV | Impala | All | 2,3,4 | All | 1,2,3 |
| James | Rathbun | bmiller@aol.com | (310) 348-1510 | Network Buyer | KRFT | All | All | 1,2,3,4 | Cable Nets | 1,2,3,4 |
| Tom | Whymark | bmiller@aol.com | (310) 348-1510 | Spot Buyer | GM | All | All | 1,2,3,4 | None | None |
| Frank | Bell | bmiller@aol.com | (310) 348-1510 | Supervisor | AMEX | All | Selected | 2,3,4 | None | None |
| Daryl | Battaglia | bmiller@aol.com | (310) 348-1510 | Spot Buyer | All | All | Selected | 2,3,4 | None | None |
| Jonathan | Chazen | bmiller@aol.com | (310) 348-1510 | National Buyer | PG | All | None | None | Nets | 1,2,3,4 |
| Hsiang | Yang | bmiller@aol.com | (310) 348-1510 | Senior Buyer | All | All | Kansas City | 1,2,3,4 | None | None |
| Chris | Gregory | Greg@MKR.com | (848) 864-0087 | Supervisor | | | | | | |

[Add/Edit User]  [User Rights]  [Print]

| Advertiser | Product | Estimate | Campaign Period | | Demo Target | | # Mkts |
|---|---|---|---|---|---|---|---|
| | | | Start | End | Primary | 2nd | |
| American Express | Gold Card | 4325 | 3/27/2006 | 5/21/2006 | A18-49 | HH | 22 |
| Chevrolet | Impala | 3124 | 3/27/2006 | 6/25/2006 | A18-49 | HH | 22 |
| Kraft | Grape Nuts | 89732 | 3/27/2006 | 6/25/2006 | A18-49 | HH | 22 |
| Paramount | Davinci Code | 4789 | 3/27/2006 | 6/25/2006 | A18-49 | HH | 22 |
| Six Flags | SF Texas | 2349 | 3/27/2006 | 6/25/2006 | A18-49 | HH | 22 |

Enter New Campaign

FIG. 9

| List | Campaign/Estimate | Ratings Methodology | Implementation Guidelines |

| | |
|---|---|
| Agency: | Mindshare |
| Advertiser: | American Express |
| Product: | Gold Card |
| Campaign: | Holiday Energy |
| Estimate#: | 4325 |
| Start: | 3/27/2006 |
| End Date: | 5/21/2006 |
| Weeks: | 8 |
| # Markets | 6 |

| Demo | Sex | From | To |
|---|---|---|---|
| Primary Dem | None ▼ | None | - None |
| Secondary | HH ▼ | HH | - HH |

| Rk | Market List: |
|---|---|
| 1 | New York |
| 2 | Los Angeles |
| 7 | Houston |
| 9 | Kansas City |
| 10 | Cleveland |
| 11 | Pittsburgh |

Save

FIG. 10

Agency User 'Election' for Audience modeling for the 'Performance-Analysis'

| NSI Metered Market Group | Audience Data | #DMAs | User Election | Modeling or not | Brief Description (see below) |
|---|---|---|---|---|---|
| 1. Metered Market | LPM | 10 | Yes | None | Use LPM demo data for performance analysis |
| 2. Metered Market | HH | 45 | ● | None | No audience data in 'Performance Analysis' reports |
| | | | ○ | Modeling | Audience est. based on 'buyer adjustment factor' using HH-ratings estimates. See #2 below |
| 3. UnMetered | None | 155 | ● | None | No audience data in 'Performance Analysis' reports |
| | | | ○ | Modeling | Audience data based on 'Buy' audience estimates. See #3 below. |

| User | Approval Date |
|---|---|
| | |

| Agency: | Mindshare | Approved ISCIs |
|---|---|---|
| Advertiser: | American Express | |
| Product: | Gold Card | |
| Campaign: | Holiday Energy | |
| Estimate #: | 4325 | |
| Start: | 3/27/2006 | |
| End Date: | 5/21/2006 | |
| Weeks: | 8 | |
| # Markets | 6 | |

Save

CUME Wk's VIEW

| Product & Estimate | | | Market | | | Campaign | | Analysis Thru | | CumeWks Partial Week GRP's to Date | | | | # Spots | Implement |
|---|---|---|---|---|---|---|---|---|---|---|---|---|---|---|---|
| Advertiser | Product | Estimate # | Demo | Rank | DMA | Buyer | Start | Plan Wks | # Wks | Thru Wk. | Buy | Actual | Index | Ach. Index | Audit |
| Hewlett Packard | Inkjet Print | 2879769 | M25-54 | 1 | New York | Miller | 3/14/2000 | 6 | 1 | 3/20/2000 | 55 | 34 | | 85 | 0% |
| Disney | Nemo | 1673390 | 4D18-34 | 1 | New York | Miller | 2/29/2000 | 6 | 3 | 3/26/2000 | 100 | 70 | | 91 | 1% |
| Kraft | Cool Whip | 1652780 | W25-54 | 1 | New York | Miller | 2/22/2000 | 6 | 4 | 3/26/2000 | 100 | 94 | | 92 | 1% |
| Dell | Personal C | 2751990 | 4D25-49 | 1 | New York | Miller | 3/14/2000 | 6 | 1 | 3/26/2000 | 30 | 24 | | 91 | 0% |
| Kellogg's | Corn Flakes | 1652738 | W18-49 | 1 | New York | Miller | 2/22/2000 | 8 | 3 | 3/26/2000 | 99 | 75 | | 94 | 0% |
| American E. | AMEX Card | 2703975 | M25-64 | 1 | New York | Miller | 1/27/2000 | 8 | 12 | 3/26/2000 | 186 | 199 | | 95 | 0% |
| Toyota | Lexus | 3567792 | M35-64 | 1 | New York | Miller | 2/7/2000 | 4 | 6 | 3/20/2000 | 186 | 98 | 96 | 95 | 0% |
| Charles Sch. | Brokerage | 9885362 | 4D35-54 | 1 | New York | Miller | 2/1/2000 | 4 | 7 | 3/20/2000 | 155 | 142 | 97 | 75 | 0% |
| Met Life | Ins Insurance | 6738490 | 4D50+ | 1 | New York | Miller | 1/25/2000 | 7 | 8 | 3/20/2000 | 170 | 155 | 94 | 82 | 0% |
| Citicorp | Checking | 3248192 | 4D25-49 | 1 | New York | Miller | 3/7/2000 | 4 | 2 | 3/20/2000 | 50 | 47 | 94 | 93 | 0% |
| P&G | Crest | 5598927 | W25-54 | 1 | New York | Miller | 2/8/2000 | 10 | 6 | 3/20/2000 | 167 | 157 | 100 | 96 | 0% |
| Coca Cola | Diet Coke | 2598673 | M25-44 | 1 | New York | Miller | 1/25/2000 | 5 | 9 | 3/20/2000 | 60 | 61 | 101 | 98 | 0% |
| P&G | Scope | 7282409 | 4D18-49 | 1 | New York | Miller | 1/25/2000 | 10 | 9 | 3/20/2000 | 210 | 215 | 102 | 92 | 0% |
| Ford | Expedition | 3425569 | 4D18-34 | 1 | New York | Miller | 2/8/2000 | 3 | 6 | 3/20/2000 | 120 | 124 | 103 | 93 | 0% |

Combined DMA Weighted Average

PARTIAL WEEK VIEW

| Product & Estimate | | | Market | | | Campaign | | Analysis Thru | | CumeWks Partial Week GRP's to Date | | | Index | Implement |
|---|---|---|---|---|---|---|---|---|---|---|---|---|---|---|
| Advertiser | Product | Estimate # | Demo | Rank | DMA | Buyer | Start | Plan Wks | # Wks | Thru Wk. | Wk. of | Est. LWK | Partial | | Audit |
| Hewlett Packard | Inkjet Print | 2879769 | M25-54 | 1 | New York | Miller | 3/14/2000 | 6 | 1 | 3/26/2000 | 3/27/2000 | 45 | 27 | 61 | 0% |
| Disney | Nemo | 1673390 | 4D18-34 | 1 | New York | Miller | 2/29/2000 | 6 | 3 | 3/26/2000 | 3/27/2000 | 60 | 39 | 65 | 1% |
| Kraft | Cool Whip | 1652780 | W25-54 | 1 | New York | Miller | 2/22/2000 | 6 | 4 | 3/26/2000 | 3/27/2000 | 20 | 15 | 75 | 1% |
| Dell | Personal C | 2751990 | 4D25-49 | 1 | New York | Miller | 3/14/2000 | 6 | 1 | 3/26/2000 | 3/27/2000 | 30 | 24 | 79 | 0% |
| Kellogg's | Corn Flakes | 1652738 | W18-49 | 1 | New York | Miller | 2/22/2000 | 8 | 3 | 3/26/2000 | 3/27/2000 | 20 | 17 | 83 | 0% |
| American E. | AMEX Card | 2703975 | M25-64 | 1 | New York | Miller | 1/27/2000 | 8 | 12 | 3/26/2000 | 3/27/2000 | 65 | 56 | 87 | 0% |
| Toyota | Lexus | 3567792 | M35-64 | 1 | New York | Miller | 2/7/2000 | 4 | 6 | 3/26/2000 | 3/27/2000 | 25 | 23 | 90 | 0% |
| Charles Sch. | Brokerage | 9885362 | 4D35-54 | 1 | New York | Miller | 2/1/2000 | 4 | 7 | 3/26/2000 | 3/27/2000 | 20 | 18 | 93 | 0% |
| Met Life | Life Insurance | 6738490 | 4D50+ | 1 | New York | Miller | 1/25/2000 | 7 | 8 | 3/26/2000 | 3/27/2000 | 10 | 9 | 94 | 0% |
| Citicorp | Checking | 3248192 | 4D25-49 | 1 | New York | Miller | 3/7/2000 | 4 | 2 | 3/26/2000 | 3/27/2000 | 15 | 14 | 94 | 0% |
| P&G | Crest | 5598927 | W25-54 | 1 | New York | Miller | 2/8/2000 | 10 | 6 | 3/26/2000 | 3/27/2000 | 20 | 20 | 100 | 0% |
| Coca Cola | Diet Coke | 2598673 | M25-44 | 1 | New York | Miller | 1/25/2000 | 5 | 9 | 3/26/2000 | 3/27/2000 | 30 | 30 | 101 | 0% |
| P&G | Scope | 7282409 | 4D18-49 | 1 | New York | Miller | 1/25/2000 | 10 | 9 | 3/26/2000 | 3/27/2000 | 10 | 19 | 102 | 0% |
| Ford | Expedition | 3425569 | 4D10-34 | 1 | New York | Miller | 2/8/2000 | 3 | 6 | 3/26/2000 | 3/27/2000 | 25 | 26 | 103 | 0% |

Daypart Delivery Index

Daypart Index of Achieved vs Buy GRPs

| | Market | Buyer | E.Morn | Daytime | E.News | PrmAccess | L.News | L.Fringe | Total |
|---|---|---|---|---|---|---|---|---|---|
| 1 | New York | C.Schultz | | 103 | 98 | 108 | 94 | 101 | 99 |
| 2 | Los Angeles | N.Schaffer | 113 | 104 | 91 | 91 | 104 | 95 | 100 |
| 3 | Chicago | J.Rathburn | 112 | 93 | 92 | 97 | | 94 | 94 |
| 4 | Philadelphia | R.Alcott | 91 | 91 | | 93 | 92 | 92 | 90 |
| 5 | San Francisco | M.Lewin | 96 | 96 | 96 | 96 | 96 | 143 | 101 |
| 6 | Boston | T.Whyman | 92 | | 92 | 100 | 91 | | |
| 7 | Dallas-Ft Worth | S.Schindig | 91 | 94 | 93 | 95 | 95 | 0 | 92 |
| 8 | Washington DC | K.Hong | 95 | 93 | 94 | 93 | 93 | 0 | 94 |
| 9 | Atlanta | L.Miller | 106 | 113 | 101 | 95 | 96 | 0 | 103 |
| 10 | Detroit | L.Douglas | | 111 | 107 | | 95 | | 96 |
| 11 | Houston | A.Cerami | 95 | 98 | | | 99 | | 91 |

| ON-THE-RUN FLASH REPORT | |
|---|---|
| PRODUCT: CREST<br>ADVERTISER: P&G<br>STATION/MKT: KABC LOS ANGELES | BUYER: G. DICKERMAN<br>AGENCY: GREY<br>AGENCY EST: 432-8765 |
| DEMO TARGET: WOMEN 18-49<br>CAMPAIGN DATES: 10/13-11/23/03 6-WEEKS | DATE: 11/7/2003<br>AUDIENCE: GREY |
| SEND EMAIL TO: [          ] | |

SPOT #1

| | PROGRAM | DAY/WEEK | DAY | TIME | RATING | CMMT |
|---|---|---|---|---|---|---|
| ORDERED: | MONDAY NIGHT FOOTBALL | 10/13 | MONDAY | 600P-900P | 6.4 | |
| AIRED: | MONDAY NIGHT FOOTBALL | 10/13 | MONDAY | 7:19P | 7.2 | CRST7589 |

COMMENTS:

SPOT #2

| | PROGRAM | DAY/WEEK | DAY | TIME | RATING | CMMT |
|---|---|---|---|---|---|---|
| ORDERED: | MONDAY NIGHT FOOTBALL | 10/13 | MONDAY | 600P-900P | 6.4 | |
| AIRED: | MONDAY NIGHT FOOTBALL | 10/13 | MONDAY | 7:19P | 7.2 | CRST7589 |

COMMENTS:

SPOT #3

| | PROGRAM | DAY/WEEK | DAY | TIME | RATING | CMMT |
|---|---|---|---|---|---|---|
| ORDERED: | MONDAY NIGHT FOOTBALL | 10/13 | MONDAY | 600P-900P | 6.4 | |
| AIRED: | MONDAY NIGHT FOOTBALL | 10/13 | MONDAY | 7:19P | 7.2 | CRST7589 |

COMMENTS:

SEND

FIG. 22

Implementation Violations

Station performance - GRPs & number of spots

| | | | | | |
|---|---|---|---|---|---|
| Advertiser: | Mazda | | Start | End | Wks |
| Product: | Mazda 6 | Campaign | 2/2/04 | 3/2/04 | 6 |
| Estimate: | 4255 | Monitored | 2/2/04 | 2/29/04 | 4 |
| Market: | New York | | | | |
| Demo: | Ad18-49 | | | | |
| Station: | WABC ▼ | | | | |

1. Station Violation Summary

| | | GRPs | | | Spots | | |
|---|---|---|---|---|---|---|---|
| Report | Station | Total | Violation | % | Total | Violation | % |
| Summary All Violations | WABC | 76.4 | 7.8 | 10.2% | 32 | 4 | 13% |
| | Total Station | 76.4 | 7.8 | 10.2% | 32 | 4 | 13% |

2. Violation Type

| | | GRP Violations | | Spot Violations | |
|---|---|---|---|---|---|
| Violation | Station | # GRPs | % Mkt GRP | # Spots | % Mkt Spots |
| 1. Wrong Commercial | WABC | 3.6 | 1.6% | 2 | 1.3% |
| | Total | 3.6 | 3.6% | 2 | 1.3% |
| 2. Prohibited Program | WABC | 4.3 | 1.9% | 2 | 1.3% |
| | Total | 4.3 | 1.9% | 2 | 1.3% |
| 3. Prohibited Day-of-week | None | | | | |
| 4. Prohibited Time-of-day | None | | | | |
| 5. Comml separation | None | | | | |
| 6. Prohibited # spots/pg. | None | | | | |
| 7. Below Minimum rating | None | | | | |

3. Station Violation Detail

[Publish]

3. Wrong "Day-Of-Week" and Wrong "Time-of-day"

| | Day-Of-Week | Time-of-Day | |
|---|---|---|---|
| Monday | ⊙ OK ○ Avoid | | |
| Tuesday | ⊙ OK ○ Avoid | | |
| Wednesday | ⊙ OK ○ Avoid | | |
| Thursday | ⊙ OK ○ Avoid | | |
| Friday | ⊙ OK ○ Avoid | | |
| Saturday | ⊙ OK ○ Avoid | | |
| Sunday | ⊙ OK ○ Avoid | | |

Enable ☐

4. Minimum Acceptable Commercial Separation Minutes

Enable ☐

Minimum separation in minutes: [0]

5. Maximum Spots in Program

| Spots in a Single Program | | Spots/wk in a Stripped Program | |
|---|---|---|---|
| 1/2 hour | 0 | 5/week | 0 |
| 1 hour | 0 | | |
| 2 hour | 0 | | |

Enable ☐

[Save Campaign] [Cancel]

METHODS AND APPARATUS TO MONITOR, VERIFY, AND RATE THE PERFORMANCE OF AIRINGS OF COMMERCIALS

RELATED APPLICATIONS

This patent claims the benefit of U.S. Provisional Patent Application No. 61/019,501, filed Jan. 7, 2008, entitled "METHODS AND APPARATUS TO MONITOR, VERIFY, AND RATE THE PERFORMANCE OF AIRINGS OF COMMERCIALS." The disclosure of which is incorporated by reference in their entirety.

FIELD OF THE DISCLOSURE

The present disclosure relates generally to media monitoring and, more particularly, to methods and apparatus to monitor, verify, and rate the performance of airings of commercials.

BACKGROUND

When advertisers purchase advertising exposure (e.g., a commercial campaign on a television network), a contract is negotiated that identifies details and/or benchmarks for how the advertisement is to be presented. For example, the contract may specify the time of day during which an advertisement is to be presented, the type of programming (e.g., television program) during which an advertisement is to be presented, the type of programming with which an advertisement is not to be presented, how much time is expected to pass between advertisement presentations, etc. Advertisement handlers (e.g., a television network) must then manage the presentation of advertisements to meet the requirements defined by the contract.

BRIEF DESCRIPTION OF THE DRAWINGS

FIG. 5 is a search user interface screen to enable users to request reports from the example performance monitoring report generator apparatus of FIG. 2.

FIG. 6 is a system administrator user interface screen to enable administrator-level users to create advertising agency accounts.

FIG. 7 is a user records user interface screen to display registered users associated with different advertisement agencies.

FIG. 8 is an advertiser/product records user interface screen to show advertiser and product information for different advertisement agencies.

FIG. 9 is an advertisement campaign user interface screen to list advertising campaigns from different advertisers.

FIG. 10 is an entry/edit user interface screen to enable a user to enter estimated information related to commercial airings of an advertisement campaign.

FIG. 11 is a ratings methodology user interface screen to enable a user to specify a particular ratings methodology to use for rating a particular advertisement campaign.

FIG. 12 is an implementation guidelines user interface screen to enable a user to specify rules for how commercials are to be broadcast.

FIG. 13 is an add/edit traffic user interface screen to enable a user to add or edit commercials for different advertisement campaigns.

FIG. 14 is a multi-market view total user interface screen to enable a user to view total advertisement campaign performance information.

FIG. 15B is a second part of a multi-market view daypart user interface screen to enable a user to view daypart advertisement campaign performance information.

FIG. 16A is a first part of a multi-market view weekly user interface screen to enable a user to view weekly advertisement campaign performance information.

FIG. 16B is a second part of a multi-market view weekly user interface screen to enable a user to view weekly advertisement campaign performance information.

FIG. 18 is a single-market weekly performance user interface screen to display performance information of a single estimate in a single market by week.

FIG. 21A is a first part of a station view spot detail user interface screen to display detailed information about detected and bought spots for a particular station.

FIG. 22 is a flash report user interface to enable a user to select rows of data from different reports and send the data to a recipient party.

FIG. 23 is a guidelines violation report default user interface screen to display an overview of violation information associated with aired commercials.

FIG. 24A is a first part of a station violation detail user interface screen to display detailed violation information associated with aired commercials.

FIG. 24B is a second part of a station violation detail user interface screen to display detailed violation information associated with aired commercials.

FIG. 25B is a second part of an implementation guidelines user interface screen to allow a user to configure the detection of violations of the guidelines specified in a buy.

Figure 31:
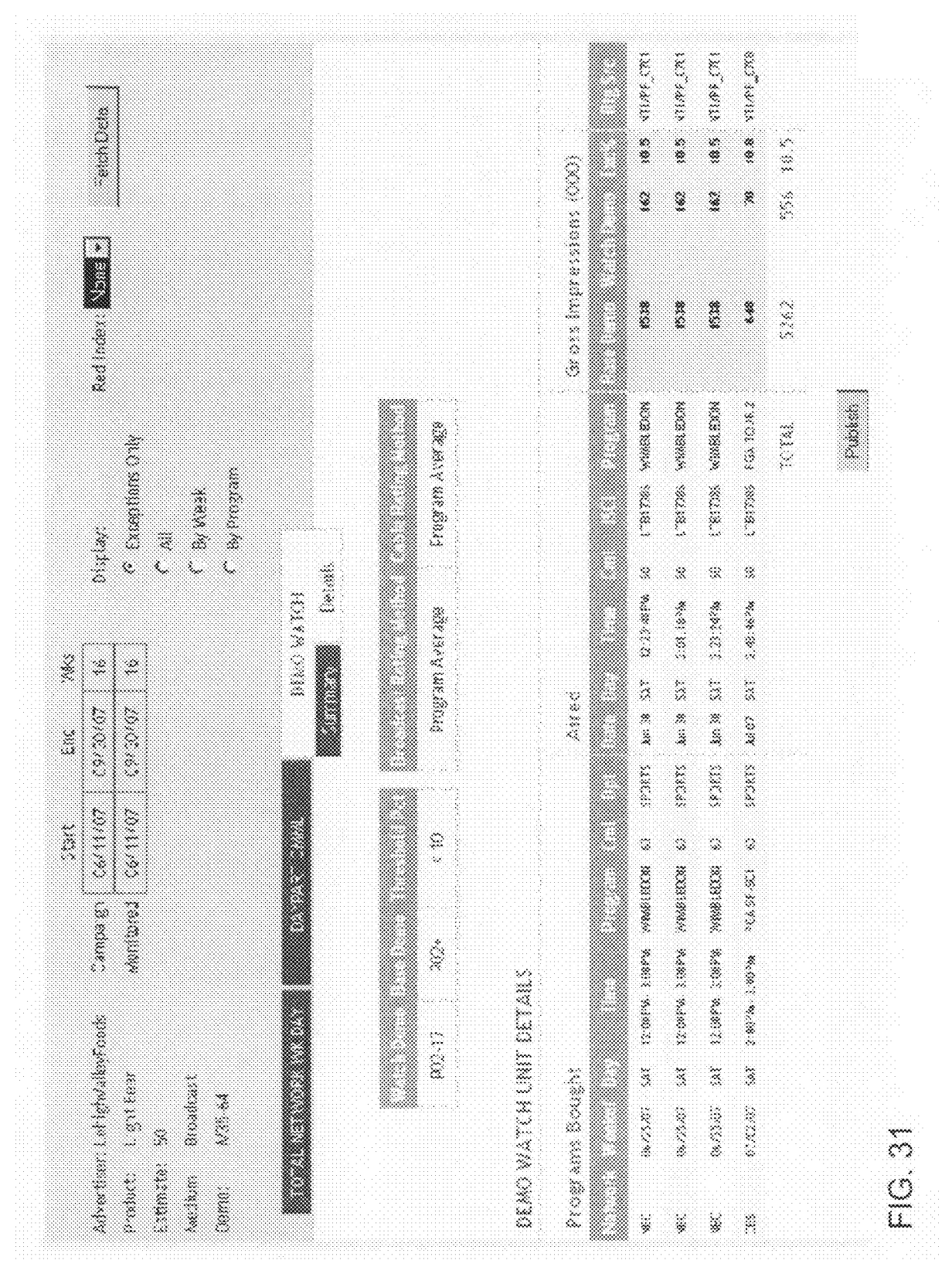

FIG. 31 is an implementation of report user interface for displaying information related to maximum exposure for aired commercials.

FIGS. 15A and 15B represent a single figure and are referenced as FIG. 15 throughout the specification. FIGS. 16A and 16B represent a single figure and are referenced as FIG. 16 throughout the specification. FIGS. 21A and 21B represent a single figure and are referenced as FIG. 21 throughout the specification. FIGS. 24A and 24B represent a single figure and are referenced as FIG. 24 throughout the specification. FIGS. 25A and 25B represent a single figure and are referenced as FIG. 25 throughout the specification.

DETAILED DESCRIPTION

Figure 1:
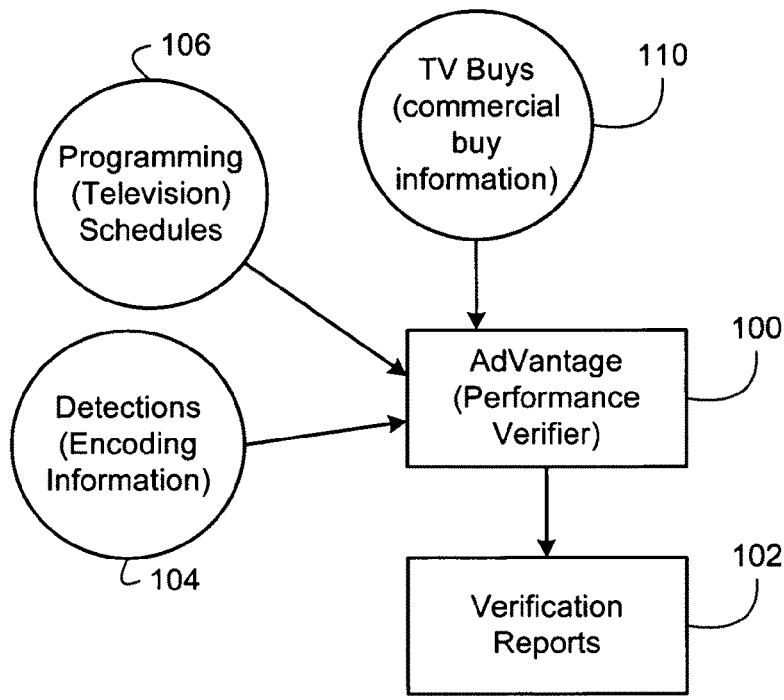
FIG. 1 illustrates an example performance verifier apparatus to generate commercial performance verification reports based on commercial detection information, program schedule information, and commercial buy information.

Although the following discloses example apparatus and systems including, among other components, software executed on hardware, it should be noted that such apparatus and systems are merely illustrative and should not be considered as limiting. For example, it is contemplated that any or all of these hardware and software components could be embodied exclusively in hardware, exclusively in software, or in any combination of hardware and software. Accordingly, while the following describes example methods, apparatus, and systems, persons having ordinary skill in the art will readily appreciate that the examples provided are not the only way to implement such methods, apparatus, and systems.

In general, the example methods and apparatus described herein may be used to monitor, verify, and rate the performance of airings of commercials. Although the example methods and apparatus are described herein using television commercials, the example methods and apparatus may be used in connection with commercials presented via different mediums including, for example, radio. As described below, the example methods and apparatus described herein are configured to generate, organize and present performance information related to the monitoring, verification and rating of aired commercials. The performance information is generated based on user-provided information that specifies how advertisement campaigns are expected to perform. In addition, the example methods and apparatus described herein enable users to specify how commercials are to be monitored and analyzed. The performance information is organized and presented using different user interface screens that enable users to specify different criteria associated with how the performance information is presented. The example implementation described herein enables advertising handlers to monitor advertising presentation while a campaign is in progress to enable adjustments to be made to the campaign to meet the specifications of the advertiser.

To verify the airing of commercial advertisements, the example methods and apparatus described herein receive user-provided estimate information describing purchase order or buy specifics for each commercial. The purchase order or buy specifics are then used to determine whether the commercials were aired as ordered and whether they reached a target demographic audience. In some example implementations, the example methods and apparatus described herein are implemented in connection with example systems, methods, and apparatus described in U.S. provision patent application No. 60/976,692, filed on Oct. 1, 2007, and titled "Systems and Methods to Associate Related Market broadcast Detections in National Detections," U.S. patent application Ser. No. 12/242,192, filed on Sep. 30, 2008, and titled "Systems, Apparatus and Method to Associate Related Market Broadcast Detections with a Multi-Market Media Broadcast," and U.S. Pat. No. 7,039,931, issued May 2, 2006, and titled "Multi-Market Broadcast Tracking, Management and Reporting Method and System," all of which are hereby incorporated by reference herein in their entireties.

In the illustrated examples described herein, commercial advertisements can be bought on a per spot or per national basis. A spot refers to the broadcast source for the television (TV) programming being discussed. A spot commercial is a commercial run on a local broadcaster, such as WABC. A spot rating is the rating for that local broadcaster. A national refers to a commercial run in connection with TV programming from a national TV broadcast network (e.g., ABC, CBS) or national cable network (e.g., Life, USA, Sci-Fi, etc.). The commercial (e.g., spots or nationals) can be bought by advertisers or advertising agencies. An advertiser is a product manufacturer or service provider that is the source of goods or services being advertised. Example advertisers are car manufacturers, food manufacturers, internet service providers, entertainment service providers, etc. An advertising agency is an agency that may be hired by an advertiser to create and/or manage advertisements including the purchasing of advertisement spots or nationals to air the advertiser's advertisements.

When an advertiser or advertising agency purchases a spot or a national, it is referred to as a buy (e.g., a purchase order). A buy is an instruction from an advertiser (or advertising agency) to a broadcaster to run a commercial or set of commercials over a set time or series of times with set rules (i.e., guidelines for airing commercials). Buy information (or purchase order information) includes estimate information to estimate airing specifics of a particular advertisement including, for example, goals for reach, frequency, demographics, average rating and market, among other metrics. The example methods and apparatus described herein are configured to generate reports indicating whether commercial airing guidelines (as set forth by rules of the buy information) have been met or violated for corresponding commercial airings.

The terms estimate and campaign are used interchangeably to refer to a subcomponent (e.g., reach, frequency, demographics, average rating, market, etc.) of the estimate of a media plan. A buy is the implementation instruction of an estimate (or campaign). The term traffic refers to instructions specifying what commercials may be aired when fulfilling a buy for a campaign. When a commercial is permitted to be run as part of a campaign, it is said to be trafficked to that campaign. When monitoring airings of commercials, a match occurs for each detection of an encoded commercial that has been matched to a buy (and, thus, to a campaign). A detected commercial that does not match any buys (and, thus, does not match any campaigns) is referred to as unordered. An allowance refers to a window of time around the buy instructions during which a commercial may be aired and still be matched to a buy.

Turning to FIG. 1, an illustrated example performance verifier apparatus 100 may be used to generate commercial performance verification reports 102 based on commercial detection information 104 (collected program name code, electronic signature, or diary information), program schedule information 106, and commercial buy information 110. The example performance verifier apparatus 100 is an analytic system that receives the commercial detection information 104, the program schedule information 106, and the commercial buy information 110 to generate the performance verification reports 102. The commercial performance verification reports 102 describe how a user (e.g., an advertising agency or an advertiser) expected a commercial to perform and the actual performance that was detected based on the airing(s) of that commercial.

Figure 2:
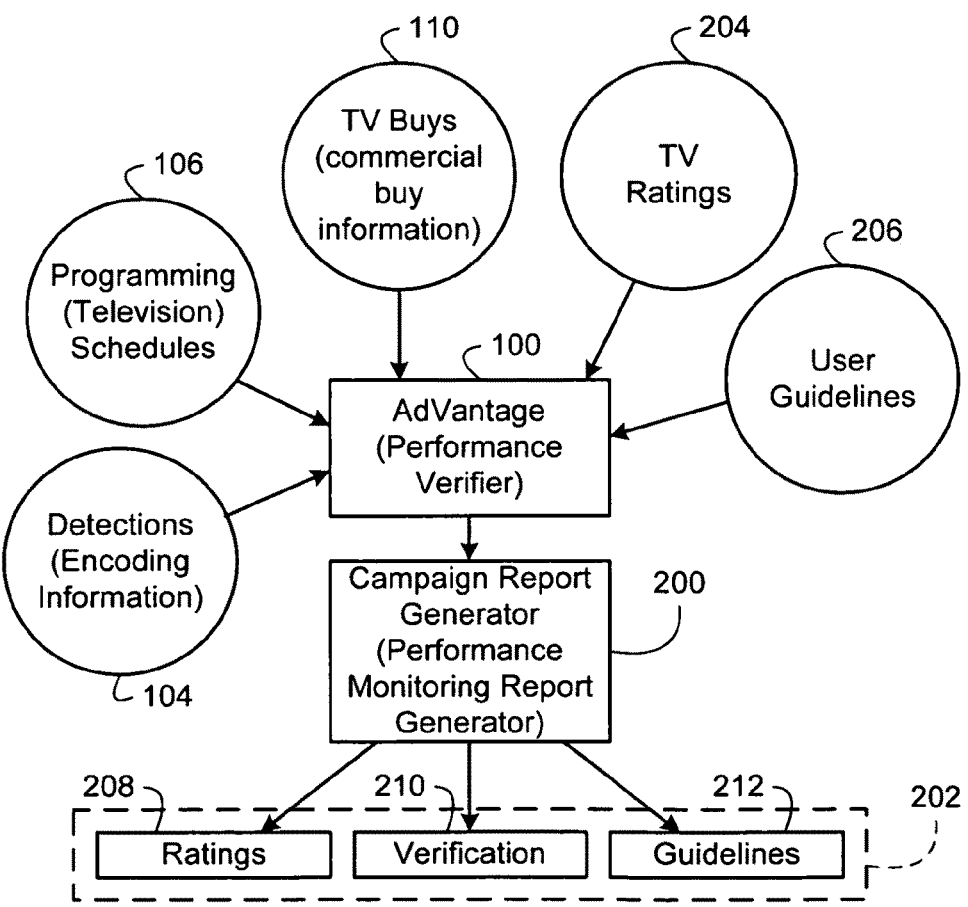
FIG. 2 illustrates an example performance monitoring report generator apparatus to generate performance monitoring reports based on information from the example performance verification apparatus of FIG. 1, ratings data, and user guideline information.

FIG. 2 illustrates an example performance monitoring report generator apparatus 200 to generate performance monitoring reports 202 based on information from the example performance verification apparatus 100 of FIG. 1, ratings data 204, and user guideline information 206. The performance monitoring reports 202 are used to report whether commercials are running when ordered, whether the commercials are run during time periods getting sufficiently high ratings, and whether the airings of the commercials are within constraints or limits specified by an advertiser or advertising agency. Each of the performance monitoring reports 202 can include one or more of ratings report information 208, verification report information 210, and guidelines report information 212. While the performance verifier apparatus 100 of FIG. 1 verifies whether commercials ran when ordered based on buys (e.g., a particular commercial ran in 5 spots during the week of March 15), the performance monitoring report generator apparatus 200 informs users whether their buy contracts are being correctly fulfilled by verifying whether commercials ran when ordered based on buys (e.g., the buy information 110), based on whether the commercials were received by the expected audience (e.g., a demographic group of males between the ages of 18-54, and a 3.6 average rating), and based on whether the commercials were run as instructed (e.g., five spots per week during the week of March 15, but never during the Jerry Springer show).

In the illustrated examples described herein, performance monitoring report generator apparatus 200 presents performance-related data using a series of user interface screens described below that are arranged in a drill-down hierarchy ranging from high level summary data to specific instance datum. This drill-down hierarchy organization allows users to relatively quickly identify under-performing buys and relatively quickly isolate the cause of the underperformance. The performance monitoring report generator apparatus 200 implements a color-coded index (e.g., a red index) to highlight data indicative of underperformance, which allows users to identify performance thresholds against which different data (e.g., rows of a data grid) is compared.

In the illustrated examples described herein, the performance monitoring report generator apparatus 200 primarily presents performance-related information using data grids. At each level of the drill-down hierarchy, the performance monitoring report generator apparatus 200 presents different data grids based on different combinations of variables/data. The processes implemented using the performance monitoring report generator apparatus 200 support the various ways that users think about data off-line or think about the concept of measuring or quantifying performance.

To enhance communications and foster collaborative work environments, the performance monitoring report generator apparatus 200 enables users to select particular data from reports (e.g., using the flash report user interface described in connection with FIG. 22) and send the selected data to others via, for example, email. Alternatively or additionally, users may download reports into spreadsheet or PDF formats, which may be redistributed to others.

In the example implementations described herein, the performance monitoring report generator apparatus 200 uses the commercial detection information 104 (FIGS. 1 and 2) to associate the detection of commercials with an audience measurement and a specific buy and to report the associated information. The performance monitoring report generator apparatus 200 enables users to submit a particular audience demographic and a ratings value expected to be achieved for a time period associated with a particular commercial along with buy information. For example, for each line of a spot-based and/or national-based buy (e.g., each ordered airing of a commercial), there may be one or more demographic/rating pairs. In the example implementations described herein, up to four demographic/rating pairs may be used. The four demographic types are referred to as the primary, secondary, tertiary, and quaternary demographics. In the example implementations described herein, for a spot-based buy, a user must provide a household ratings estimate as well. In the illustrated examples described herein, the performance monitoring report generator apparatus 200 matches each commercial detection to a single buy. Thus, the performance monitoring report generator apparatus 200 does not generally associate a commercial detection with a product, but instead with a buy so that the performance of the commercial detection can be determined and quantified based on the buy information.

Figure 3:
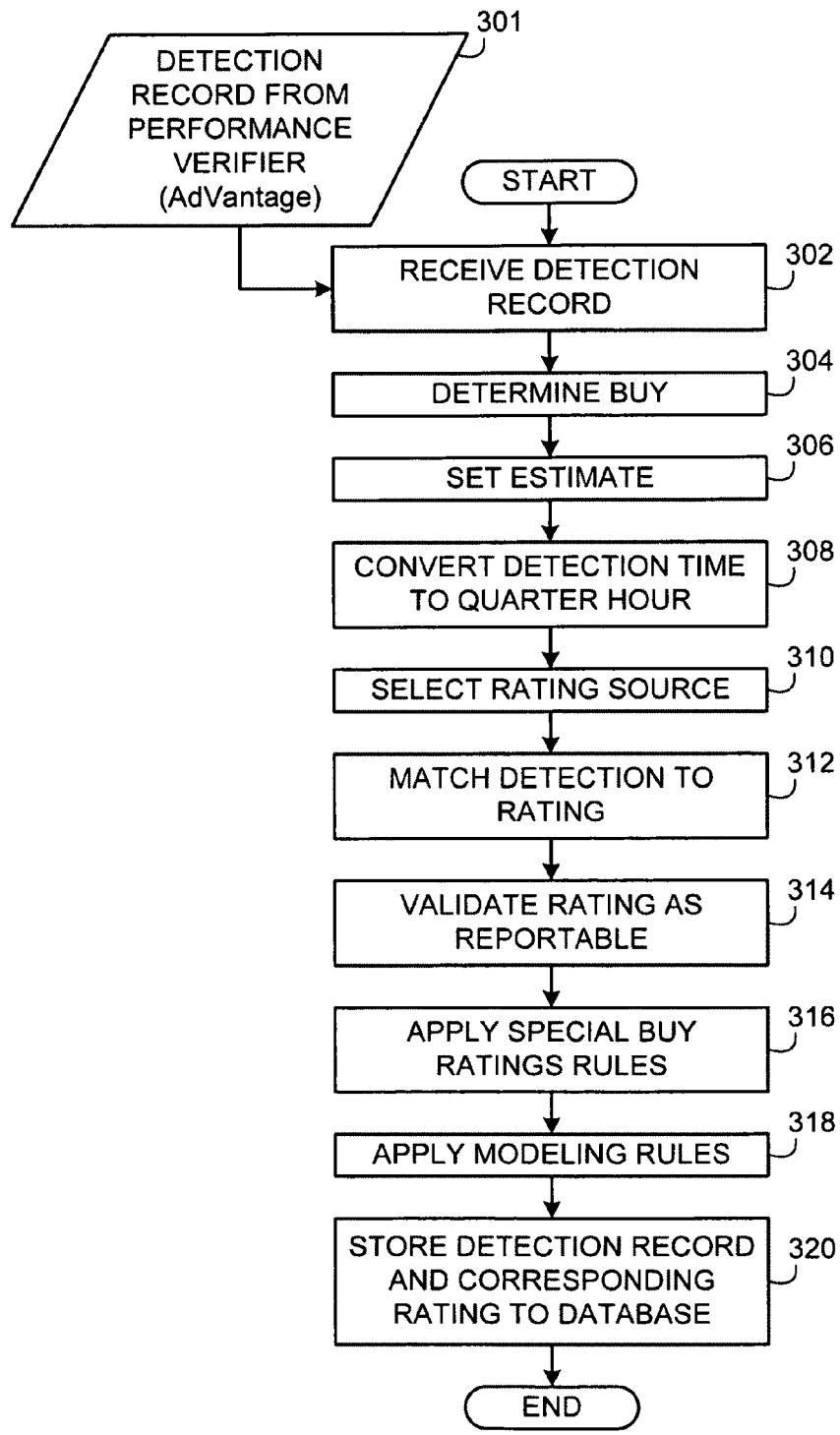
FIG. 3 is a flow diagram representative of machine readable instructions that may be executed to implement the performance monitoring report generator apparatus of FIG. 2.

FIG. 3 is a flow diagram representative of machine readable instructions that may be executed to implement the performance monitoring report generator apparatus 200 of FIG. 2. Some or all of the blocks of each the flow diagram may be representative of machine readable instructions that may comprise one or more programs for execution by one or more processors (e.g., the processor 2812 of FIG. 28), one or more controllers, and/or any other suitable devices. The one or more programs may be embodied in software stored on a tangible medium such as, for example, one or both of the memories 2824 and 2825 of FIG. 28. The entire program or programs and/or portions thereof could alternatively be executed by a device other than the processor 2812 and/or may be embodied in firmware or dedicated hardware in any desired manner (e.g., implemented using an application specific integrated circuit (ASIC), a programmable logic device (PLD), a field programmable logic device (FPLD), discrete logic, etc.). Also, some or all of the operations of the flow diagram of FIG. 3 may be implemented manually. Further, although the example method is described with reference to the flow diagram illustrated in FIG. 3, many other techniques for implementing the example methods and apparatus described herein may alternatively be used. For example, with reference to the flow diagram illustrated in FIG. 3, the order of execution of the blocks may be changed, and/or some of the blocks described may be changed, eliminated, combined and/or subdivided into multiple blocks.

In the illustrated example of FIG. 3, the performance monitoring report generator apparatus 200 receives a detection record 301 (block 302) from the performance verifier apparatus 100 of FIG. 1. The detection record 301 is generated by the performance verifier apparatus 100 and includes information indicating that buys were matched with commercial detections to verify whether or not the buys were fulfilled. The information in the detection record is organized using the following headers: 1) time, 2) date, 3) station, 4) market, 5) buy (if matched to a buy), and 6) allowance status (before, during, or after an ordered time or time range).

If the example implementation includes both local and national commercial monitoring, the system may determine which type of commercial is associated with the detection record at this time. Using the detection record, the performance monitoring report generator apparatus 200 determines buy information (block 304). For example, if the detection record 301 indicates that a corresponding detected commercial is unmatched to a specific buy (e.g., it may have been generally matched to a product by the performance verification apparatus 100 of FIG. 1), the performance monitoring report generator apparatus 200 associates the unordered detection to a single buy. To match the commercial detection of the detection record 301 to a specific buy, the performance monitoring report generator apparatus 2001) identifies all buys to which the detected commercial is trafficked; 2) identifies which buys include the detection record's market; 3) if only one buy includes the detection record's market, then assign the detection record 301 to that buy; 4) if more than one buy matches the market of the detection record, then identify which buys include the market and station for the detection record 301; 5) if only one buy includes the market and station of the detection record, then assign the detection record 301 to that buy; 6) if more than one buy matches the detection record's market and station, then identify which buys include the market, station and included dates w/in two weeks of for the detection; 7) if only one buy includes the detection record's market, station, and included dates, then assign the detection record 301 to that buy; 8) if more than one buy matches the detection record's market, station, and included dates, then identify which buys include the market, station, and week-of for the detection record 301; 9) if only one buy matches the detection record's market, station, and week-of, then assign the detection record 301 to that buy; 10) if more than one buy matches the detection record's market, station, and week-of, determine which buy has the earliest start date; 11) if only one buy has the earliest start date, then assign the detection record 301 to that buy; 12) if more than one buy share the same earliest start date, then determine which buy has the lowest estimate number; and 13) assign the detection record 301 to the buy with the lowest estimate number.

The estimate or campaign for the buy determined at block 304 is then set (block 306) based on the buy information and any other user-submitted information. The performance monitoring report generator apparatus 200 then converts the detection time of the detection record into quarter hour segments (block 308). For example, a detection time of (09:12:56) is converted to a quarter hour (09:00-09:14:59). Users are allowed to configure a permitted allowance for matching detections to buys. For example, with a 2 minute allowance, the system will match a 4:58:36 detection to a 5:00-7:00 buy. When an allowance match is made, the detection quarter hour is set as the nearest quarter hour within the buy instructions. Each matched detection record reports a character (e.g., B, D or A) to indicate if the detection was [B]efore the buy, but in the allowance, [D]uring the buy, or [A]fter the buy, but in the allowance. The character is used to determine the closest quarter hour within the buy.

The performance monitoring report generator apparatus 200 then selects a ratings source (block 310). For example, the performance monitoring report generator apparatus 200 of the illustrated example loads Nielsen Audience Measurement data into a database as those measurements are made available to the public. There are different sources for different markets and market coverage. To select a source, the performance monitoring report generator apparatus 200 of the illustrated example evaluates how a user configured the buy and the ratings sources available to determine which is the best ratings source to use. For example, if the Viewers In Profile (VIP) report from Nielsen Media Research is available for a detection market and date, it is used. If it is not available, the Nielsen Media Research Live+7 report is used. If the Live+7 report is not available, the Nielsen Media Research Overnight report is used. If none of the reports are available, a ratings source may not be set and modeling rules may be used (as described in further detail below). Additionally, a user may specify that modeling rules should be used even when a report is available.

The performance monitoring report generator apparatus 200 then matches the detection to measurements (block 312). Using the quarter hour and date of the detection and the rating source previously selected, the system retrieves the appropriate impressions and universal estimate. A television rating is calculated using ratings formulas (e.g., ratings formulas published by Nielsen Media Research). If no rating source was selected, this block may be skipped.

After matching detections to measurements (block 312), the ratings information is validated (block 314). For example, the ratings information must have sufficient in-tab and must be statistically significant. Then, the performance monitoring report generator apparatus 200 of the illustrated example applies special buy rules and changes ratings values as specified by the rules (block 316). For example, if a buy includes a "–s" value in a line of the buy, the system is instructed to use the target ratings value in place of the actual ratings value in its reports (Dash S feature). In another example, if a buy is for an exact time either on the hour or half hour, the system is instructed to average the two adjacent quarter hours and use that average in place of the actual ratings value (Break-buy feature).

Then, the performance monitoring report generator apparatus 200 applies modeling rules (block 318). In the illustrated example, modeling is the estimation of a television rating when no true rating is available. For example, in a first market, no overnight demographic ratings are available and in another market no VIP ratings are released. When no ratings information is available, model ratings are used. For example, model demographics may be estimated based on households and/or all values of information may be estimated. For example, when demographic ratings are not available for a market, a modeling demographic is calculable by taking the ratio between the estimated household rating provided in the buy and the actual household rating and, then, applying it to the estimated demographic rating to achieve a modeled demographic rating. In another example, when no ratings source is available for several months, targeted ratings values from the buy may be used as the actual values.

Then, the performance monitoring report generator apparatus 200 stores the detection record and corresponding ratings information to a database (block 320). The detection record and/or ratings information can be retrieved from the database to analyze the results of a campaign.

FIGS. 4-24 are graphical user interfaces that allow users to access and use the example performance monitoring report generator apparatus of FIG. 2. The example graphical user interfaces allow users to monitor whether the television commercial campaigns they have bought are aired as ordered and get the market weight and pressure desired by advertisers.

Figure 4:
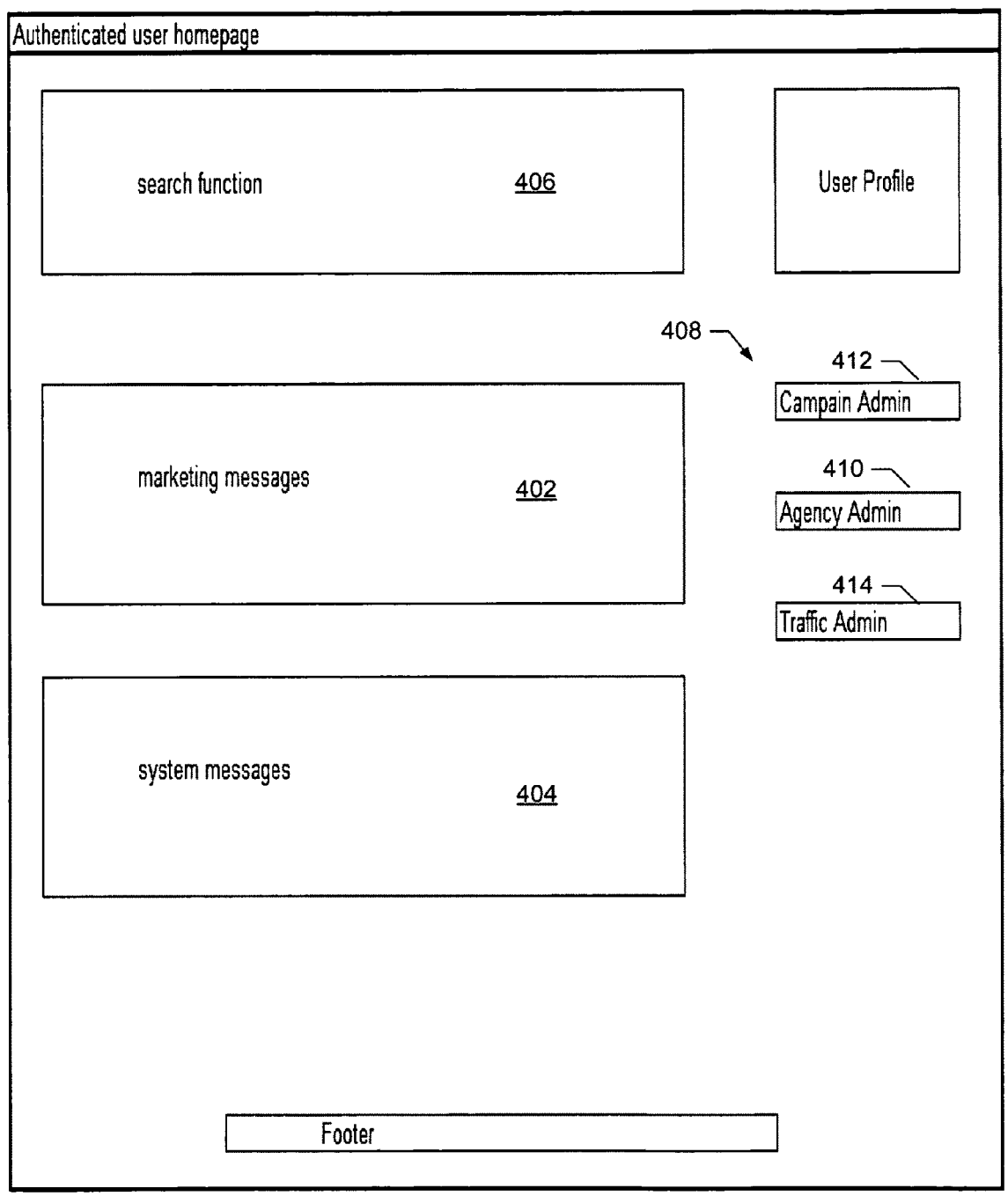
FIG. 4 is a user login user interface screen to authenticate registered users and grant those users access to the example performance monitoring report generator apparatus of FIG. 2.

FIG. 4 is a user login user interface screen to authenticate registered users and grant those users access to the example performance monitoring report generator apparatus of FIG. 2. Access to the registered user homepage is restricted and is controlled by the log-on function from the default homepage. The screen contains four basic modules: marketing messages 402, system messages 404, a search function 406, and administration links 408. In the illustrated example, the search function 406 and the administrative links 408 are based on the user's user-type. In the illustrated example, an agency administration link 410 links to a system administrator user interface (e.g., the system administrator user interface screen of FIG. 6). A campaign administration link 412 links to an advertisement campaign user interface (e.g., the advertisement campaign user interface screen of FIG. 9). A traffic administration link 414 links to a traffic user interface screen (e.g., the traffic user interface screen of FIG. 13).

Figures 5, 6:
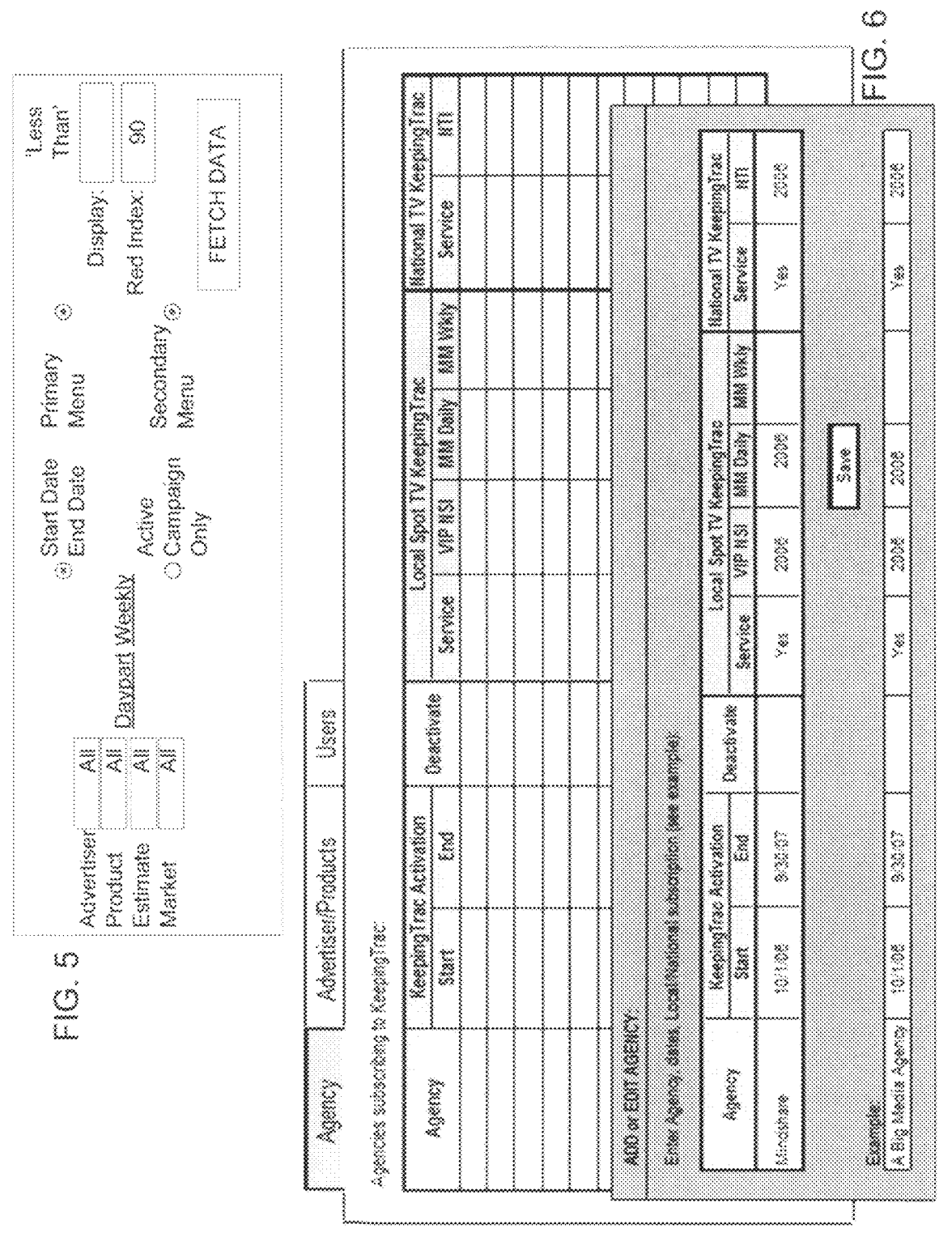

FIG. 5 is a search user interface screen to enable users to request reports from the example performance monitoring report generator apparatus of FIG. 2. The search function is a form in which the user selects information from pull-downs, pop-up calendars, and radio buttons. The data grid of the search results is based on the search criteria entered and the user's permissions.

FIG. 6 is a system administrator user interface screen to enable administrator-level users to create advertising agency accounts. Within the system administrator user interface screen the user creates agency accounts, adds advertiser and product records to those accounts, and then creates the initial user accounts for the agency. The system administrator user interface screen of the illustrated example includes tabs that allow a user to select which type of record to input. The print function causes a comma separated values (CSV) file to be downloaded containing the current data grid information.

FIG. 7 is a user records user interface screen to display registered users associated with different advertisement agencies. The example user records user interface screen of FIG. 7 is displayed when a user selects an advertiser/products tab of the system administrator user interface screen of FIG. 6. The print function causes a CSV file to be downloaded containing the current data grid information.

FIG. 8 is an advertiser/product records user interface screen to show advertiser and product information for different advertisement agencies. The example user records user interface screen of FIG. 8 is displayed when a user selects a users tab of the system administrator user interface screen of FIG. 6. The agency drop down menu allows users to select which agency's users are displayed. As items are selected from the drop down menu, the data grid changes. The print function causes a CSV file to be downloaded containing the current data grid information.

FIG. 9 is an advertisement campaign user interface screen to list advertising campaigns from different advertisers. When a user selects a campaign and chooses an enter new campaign button, the user is taken to a campaign/estimate screen (e.g., the campaign/estimate screen of FIG. 10) where the user can input new campaign information. In the illustrated example, when a user clicks on a number in an estimate column, the user is taken to a campaign/estimate screen that is pre-populated with information from the selected campaign so that the user can edit the information.

FIG. 10 is an entry/edit user interface screen to enable a user to enter estimated information related to commercial airings of an advertisement campaign. When a user is creating a new campaign, the entry/edit user interface screen is blank when a user reaches the screen. When a user is editing a campaign, the entry/edit user interface screen is pre-populated with information about the campaign to be edited. The entry/edit user interface screen includes several tabs. A list tab returns the user to the campaign list screen. A ratings methodology tab takes the user to a ratings methodology screen (e.g., the ratings methodology user interface screen of FIG. 11) where the user selects the ratings methodology for the display campaign. An implementation guidelines tab takes the user to an implementations guidelines screen (e.g., the implementation guidelines user interface screen of FIG. 12) where the user sets the implementation guidelines for the displayed campaign.

FIG. 11 is a ratings methodology user interface screen to enable a user to specify a particular ratings methodology to use for rating a particular advertisement campaign. The ratings methodology user interface screen includes a user election radio button for each type of metered market that allows a user to select whether modeled data should be used. The example ratings methodology user interface screen also includes a radio button to allow a user to select whether to model data in unmetered markets (e.g., where only VIP information is available). A user field and an approval date field enable a user to input identification information about who changed/set the values and the date on which the change/setting was made. A save button allows a user to save the data to the database.

Figure 12:
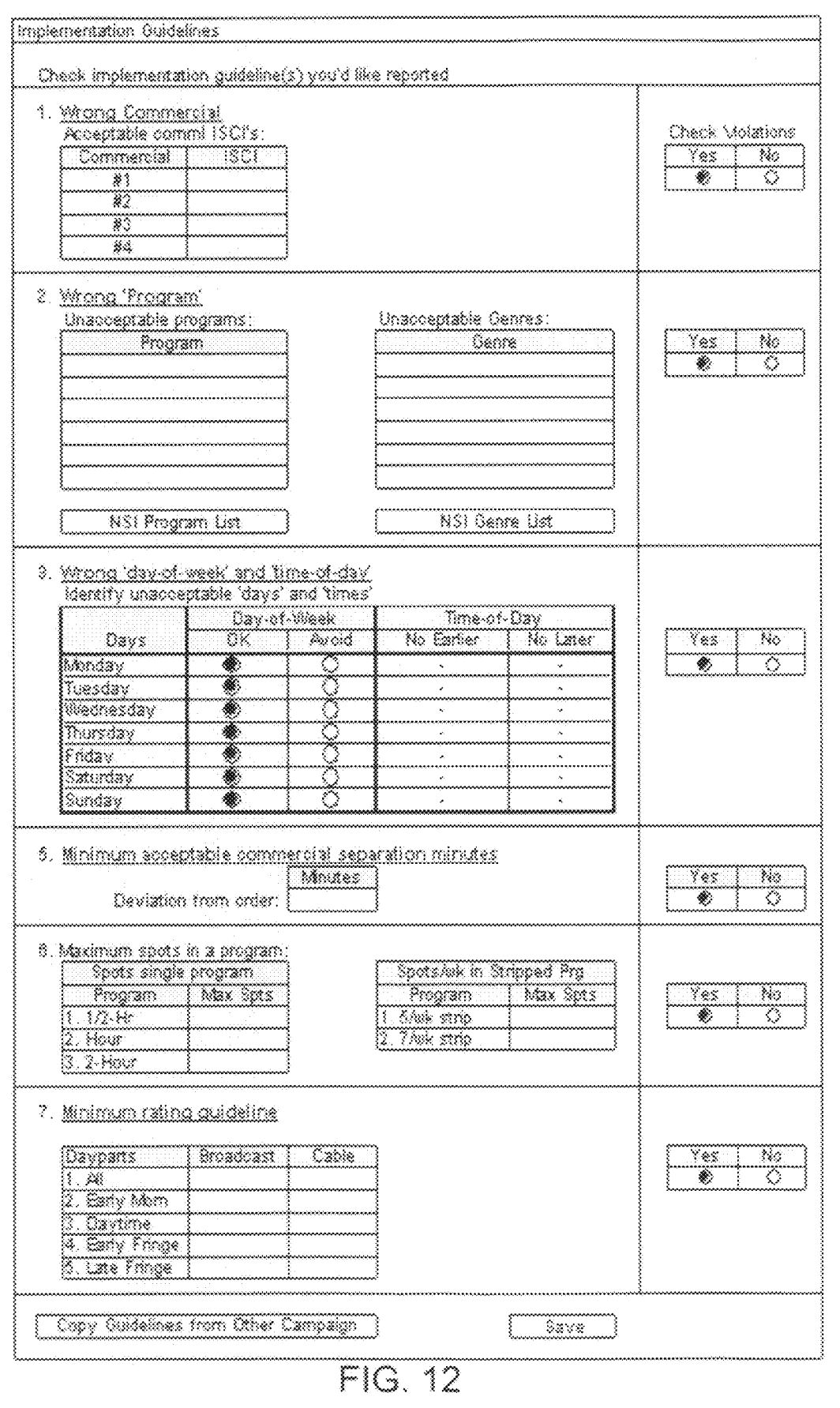

FIG. 12 is an implementation guidelines user interface screen to enable a user to specify rules for how commercials are to be broadcast. A copy guidelines from another campaign drop down menu allows a user to select a previously existing campaign to populate the fields of the form.

FIG. 13 is an add/edit traffic user interface screen to enable a user to add or edit commercials for different advertisement campaigns. A user (e.g., an administrator) assigns commercials to campaigns. Commercials are referenced by an industry standard commercial identifier (ISCI). For example, each commercial has a unique ISCI. In the illustrated example, traffic is entered at the campaign level. The approved ISCI field contains ISCIs for traffic that exists for the campaign and allows a user to enter approved ISCIs for the campaign.

FIG. 14 is a multi-market view total user interface screen to enable a user to view total advertisement campaign performance information. Users arrive at the multi-market view total user interface screen when a search is executed on the authenticated user homepage. The data grid of the multi-market view are based on the search criteria. Each row of the data grid of the illustrated example is for a unique combination of advertiser, product, market, and estimate. A user can execute a new search by changing the form values and then selecting a fetch data button. A user can select one of a primary or secondary demographic associated with a campaign by selecting a radio button next to a desired demographic and selecting the fetch data button.

In the illustrated example, each campaign has an index that is calculated by dividing achieved gross rating points (GRPs) into the buy GRPs. A less-than display instructs the system to display only those campaigns that are performing below the numeric threshold set by the user. A less-than red index instructs the system to highlight in red the cells of the campaigns performing below the numeric threshold set by the user. For example, in the illustrated example, the index for Hewlett Packard is highlighted in red.

Figure 15A:
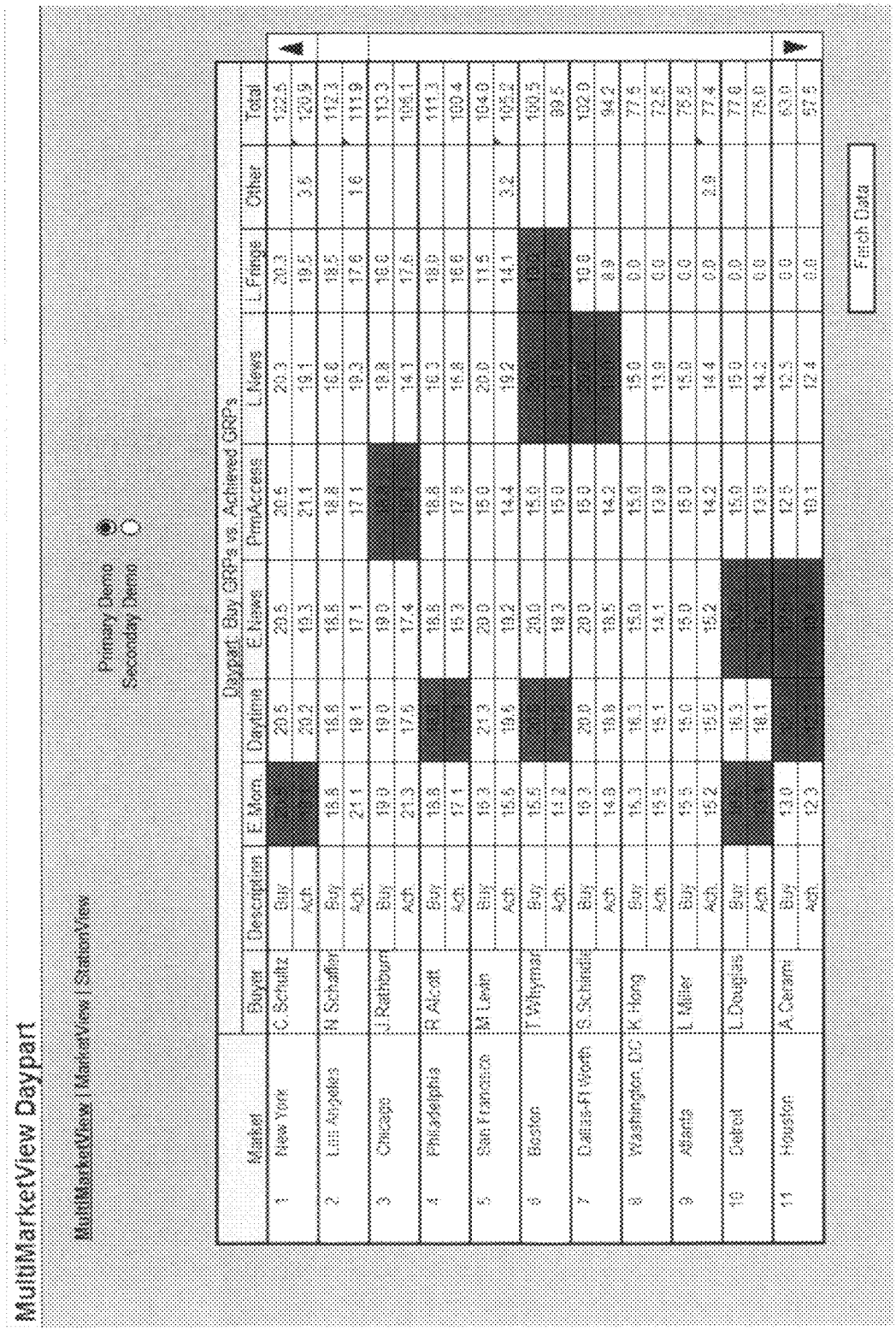
FIG. 15A is a first part of a multi-market view daypart user interface screen to enable a user to view daypart advertisement campaign performance information.

FIG. 15 is a multi-market view daypart user interface screen to enable a user to view daypart advertisement campaign performance information. The multi-market view daypart user interface screen displays how a single estimate has performed across many markets by daypart. In the illustrated example, each campaign has a primary and a secondary demographic assigned to it during set-up. The selection of a demographic affects the information presented in the example multi-market view daypart user interface screen. In the illustrated example, the Total value for each record is a hyperlink to a multi-market view total screen (e.g., the multi-market view total screen of FIG. 17). In the illustrated example, the Weekly value for each record is a hyperlink to a multi-market view weekly screen (e.g., the multi-market view weekly screen of FIG. 16).

Figure 16A:
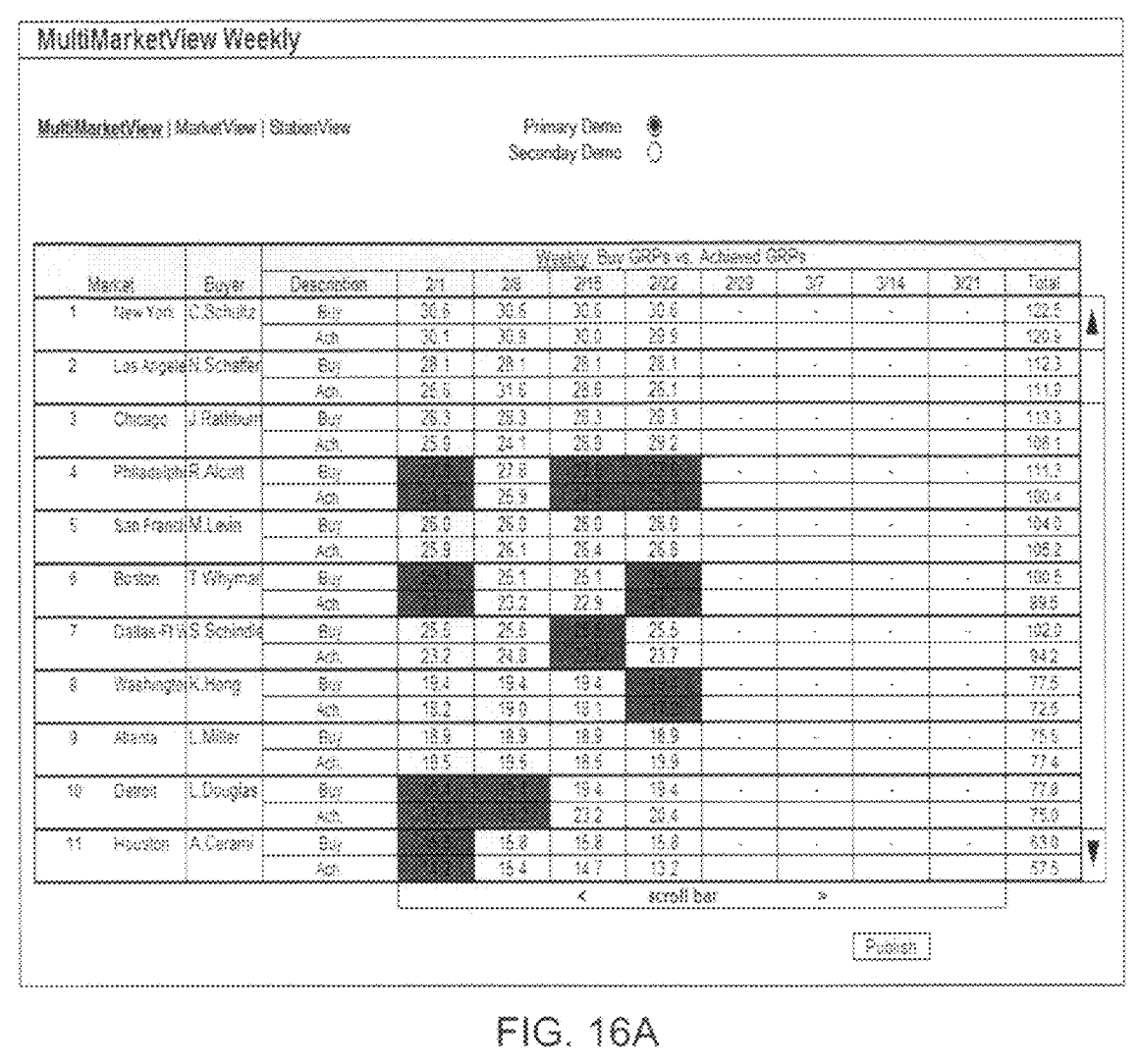
Figure 16B:
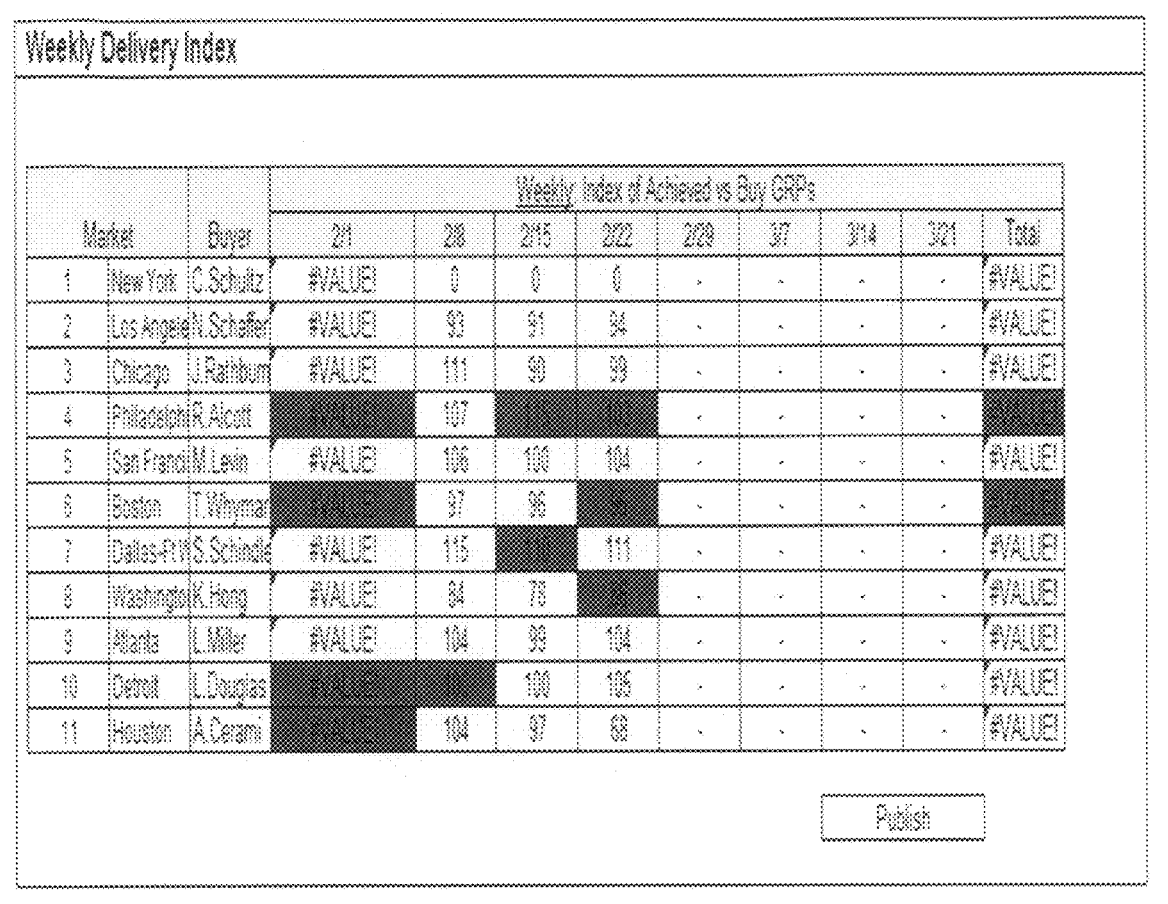

FIG. 16 is a multi-market view weekly user interface screen to enable a user to view weekly advertisement campaign performance information. The multi-market view weekly user interface screen of the illustrated example displays how an estimate has performed across many markets by week.

Figure 17:
FIG. 17 is a single-market performance user interface screen to display performance information of a single estimate in a single market.

FIG. 17 is a single-market performance user interface screen to display performance information of a single estimate in a single market. The single-market performance user interface screen shows the user the performance of a single estimate in a single market. An example implementation audit hyperlink causes the user to navigate to a guidelines violation report screen (e.g., the guidelines violation report screen of FIG. 23). An example station call letter hyperlink causes the user to navigate to a station view total screen (e.g., the station view total screen of FIG. 19) where the data is narrowed to a selected station. An example GRP index hyperlink causes the user to navigate to the station view total screen.

Figure 18:
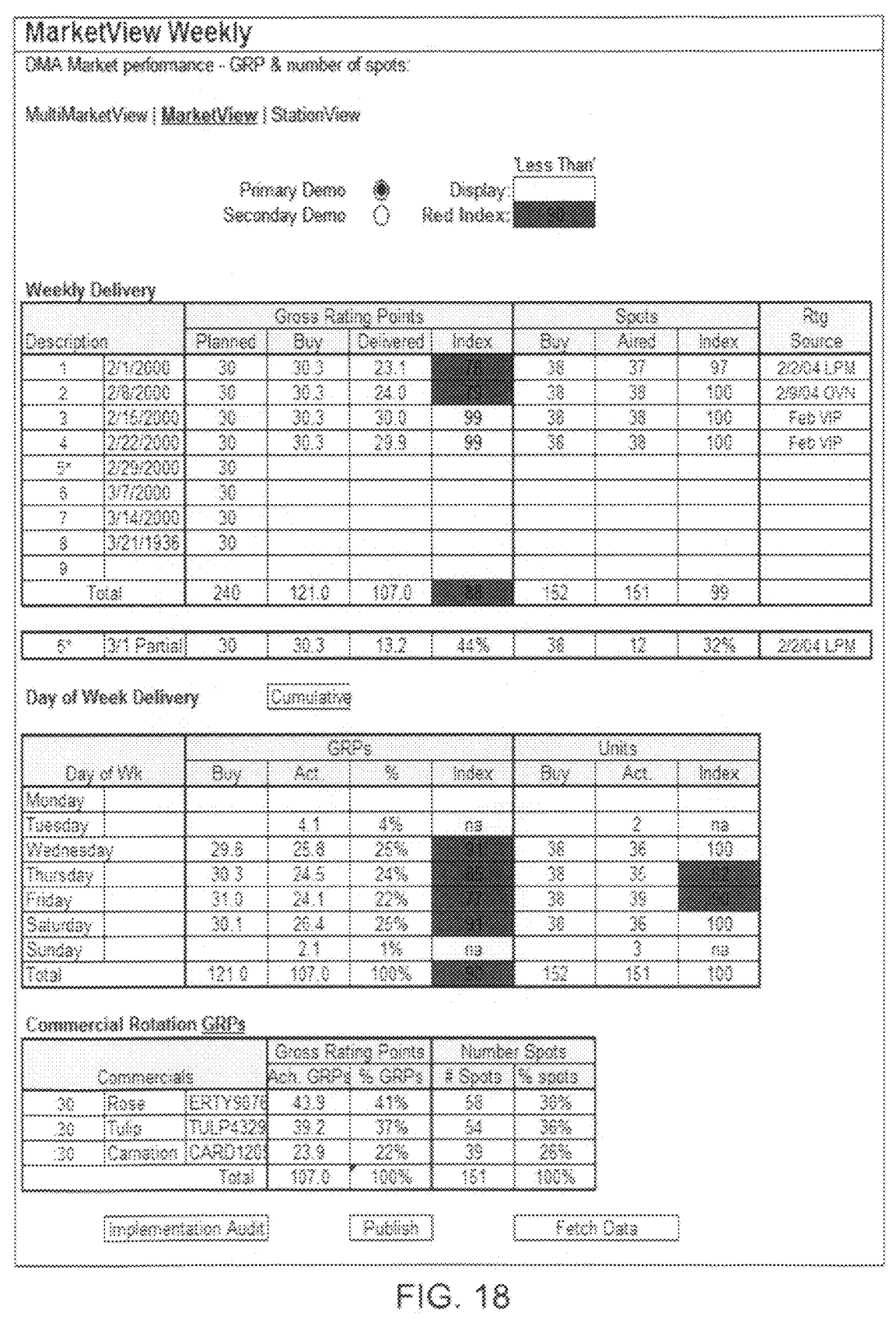

FIG. 18 is a single-market weekly performance user interface screen to display performance information of a single estimate in a single market by week. A day of the week data grid is populated based on a day of the week delivery drop down menu. For example, the drop down menu has a default value of cumulative, which indicates that an aggregation of values for all weeks in the campaign (limited by the search request) should be shown. The example drop down menu includes values for the completed weeks for the campaign. Selecting a weekly value from the drop down menu causes the day of the week data grid to display information for the selected week.

Figure 19:
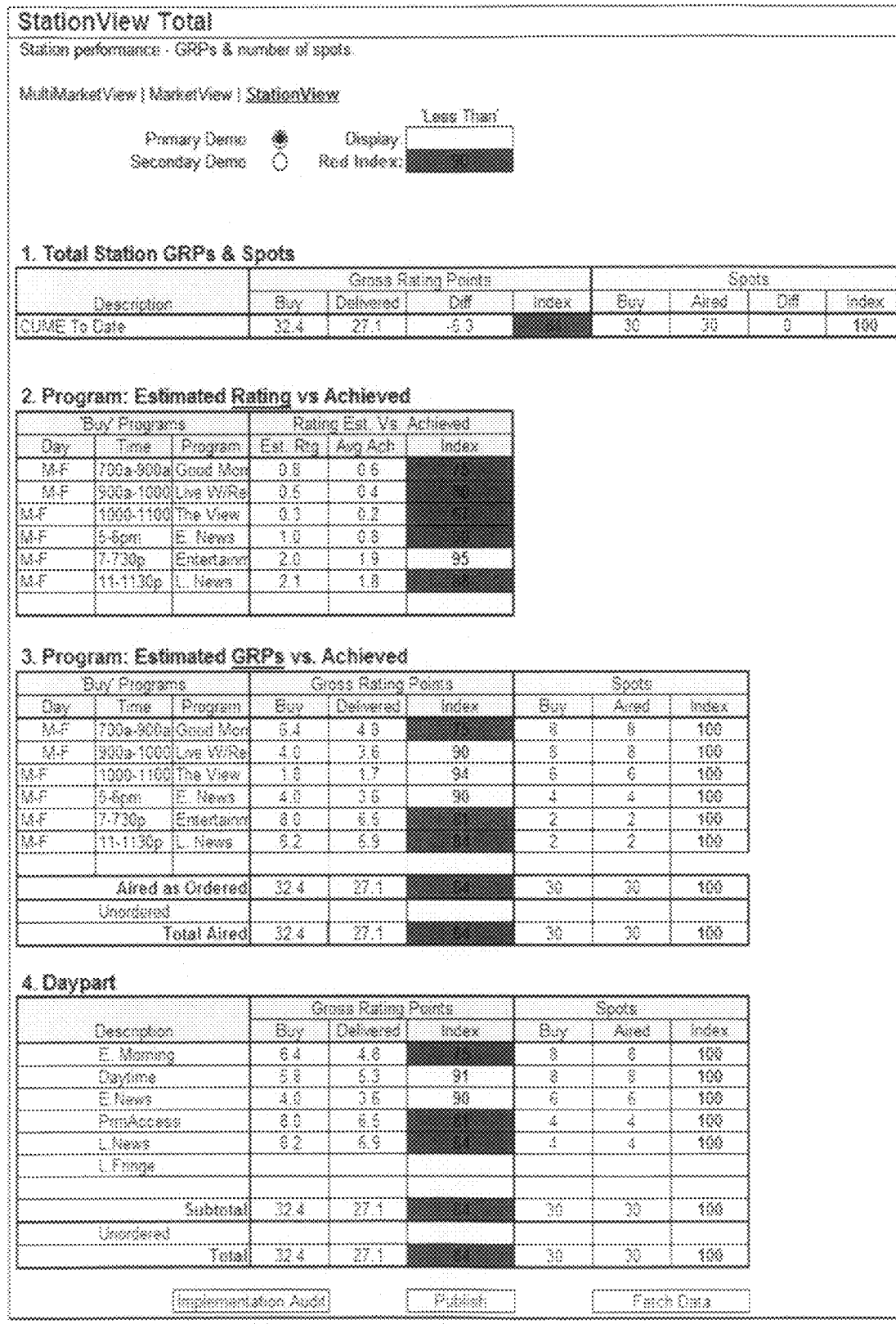
FIG. 19 is a station view total user interface screen to display total estimated versus actual rating and gross rating point (GRP) data for a particular station.

FIG. 19 is a station view total user interface screen to display total estimated versus actual rating and GRP data for a particular station. In the illustrated example, the station view total user interface screen is populated based on the last search conducted by a user.

Figure 20:
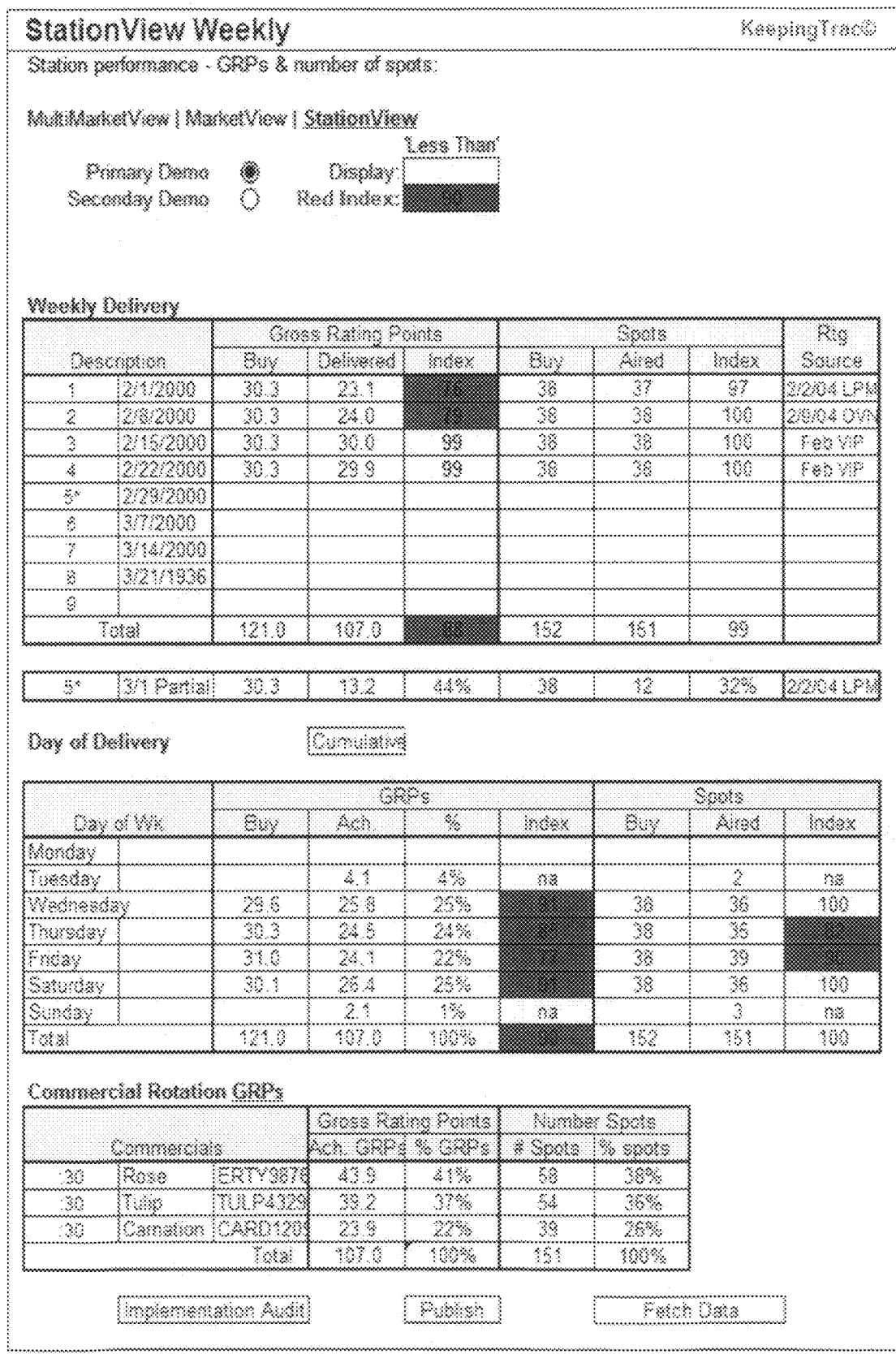
FIG. 20 is a station view weekly user interface screen to display estimated versus actual rating and GRP data for a particular station by week.

FIG. 20 is a station view weekly user interface screen to display estimated versus actual rating and GRP data for a particular station by week. In the illustrated example, the station view weekly user interface screen is populated based on the last search conducted by a user.

Figure 21A:
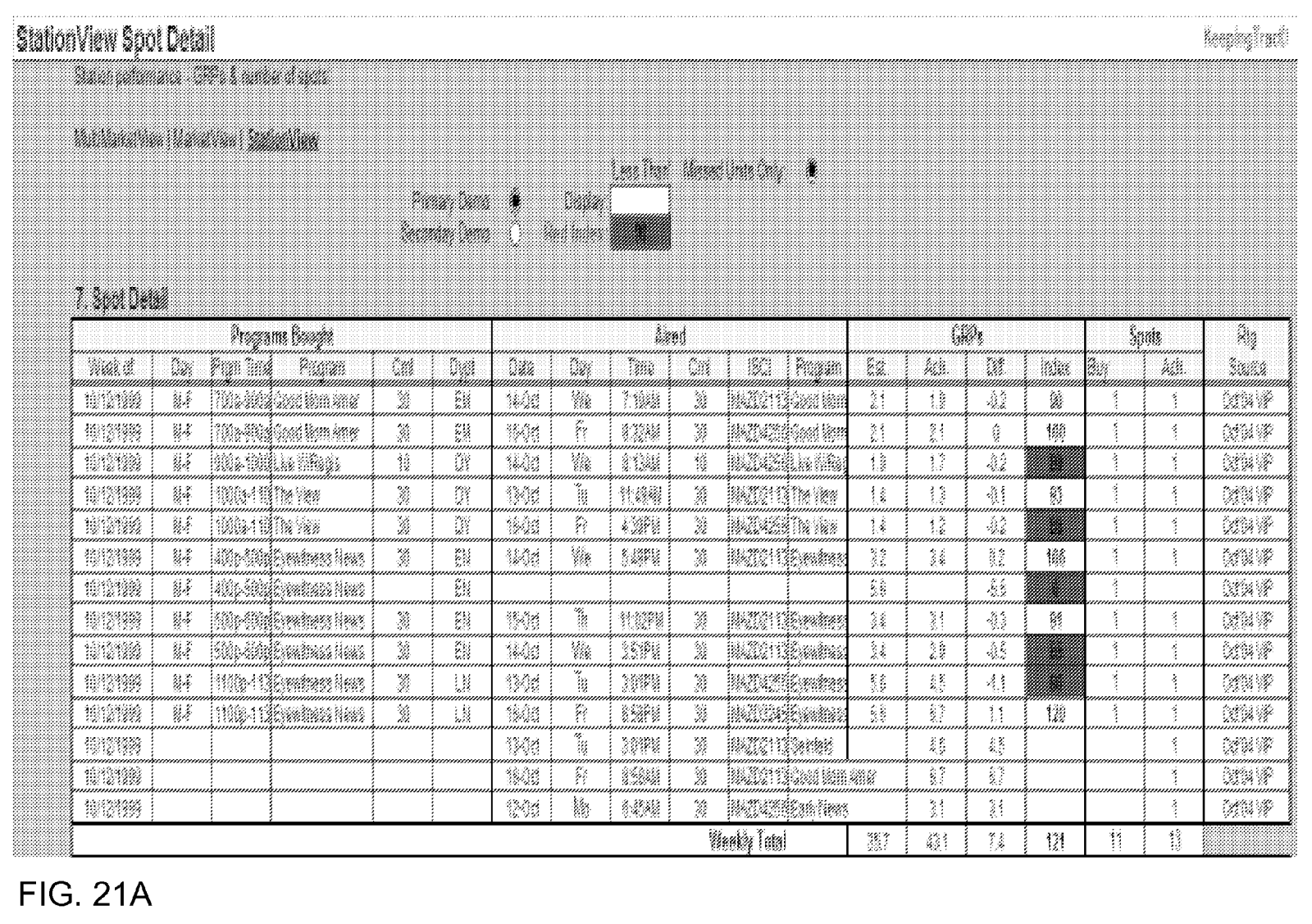
Figure 21B:
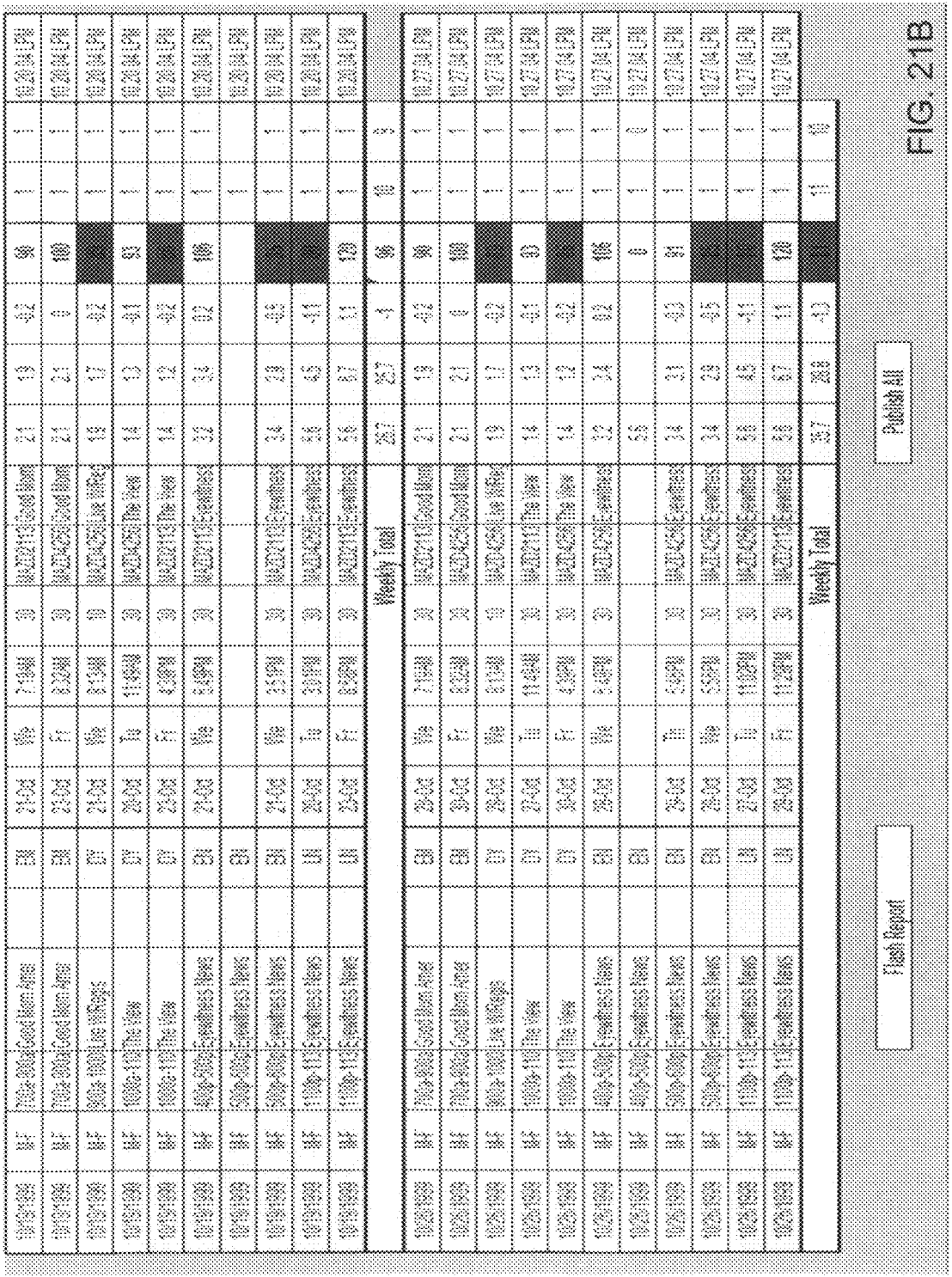
FIG. 21B is a second part of a station view spot detail user interface screen to display detailed information about detected and bought spots for a particular station.

FIG. 21 is a station view spot detail user interface screen to display detailed information about detected and bought spots for a particular station. In the illustrated example, the station view spot detail user interface screen displays a line-by-line detail of detected spots and bought spots including details of the buy, details of the airing of the spot, and ratings information about the airing compared with the estimated ratings information. The example station view spot detail user interface screen includes a missed units only function that allows a user to request that only information for spots that were bought but not detected be displayed. The station view spot detail user interface screen of the illustrated example includes a flash report function that allows the user to select rows from the data grid and send information from those rows to others via email or any other communication medium. A user can select one or more rows to be sent in a flash report. When a row is selected, the row is highlighted in yellow. When a row is selected a second time, the row is de-selected. After selecting a row, the user selects a flash report button, which causes a flash report user interface to be displayed (e.g., the flash report user interface screen of FIG. 22).

FIG. 22 is a flash report user interface screen to enable a user to select rows of data from different reports and send the data to a recipient party. For example, the flash report user interface enables a user to select rows of data from a multi-row data grid of one or more of the user interfaces described herein and send those rows of data along with comments to others via email. The flash report user interface of the illustrated example verifies that the email address input by the user is properly formed (e.g., includes an account, the @ symbol, and a domain name).

FIG. 23 is a guidelines violation report default user interface screen to display an overview of violation information associated with aired commercials. Users can reach the guidelines violation report default user interface screen by selecting a value displayed in an implementation audit column of a multi-market view total user interface (e.g., the multi-market view total user interface screen of FIG. 14) or by selecting an implementation audit button on a user interface (e.g., the implementation audit button on the station view weekly user interface screen of FIG. 20). In the illustrated example, when a user selects a station violation detail hyperlink the user is taken to a station violation detail screen (e.g., the station violation detail screen of FIG. 24). The guidelines violation report default user interface screen may include a link to return the user to the user interface screen from which the user linked to the guidelines violation report default user interface screen.

Figure 24A:
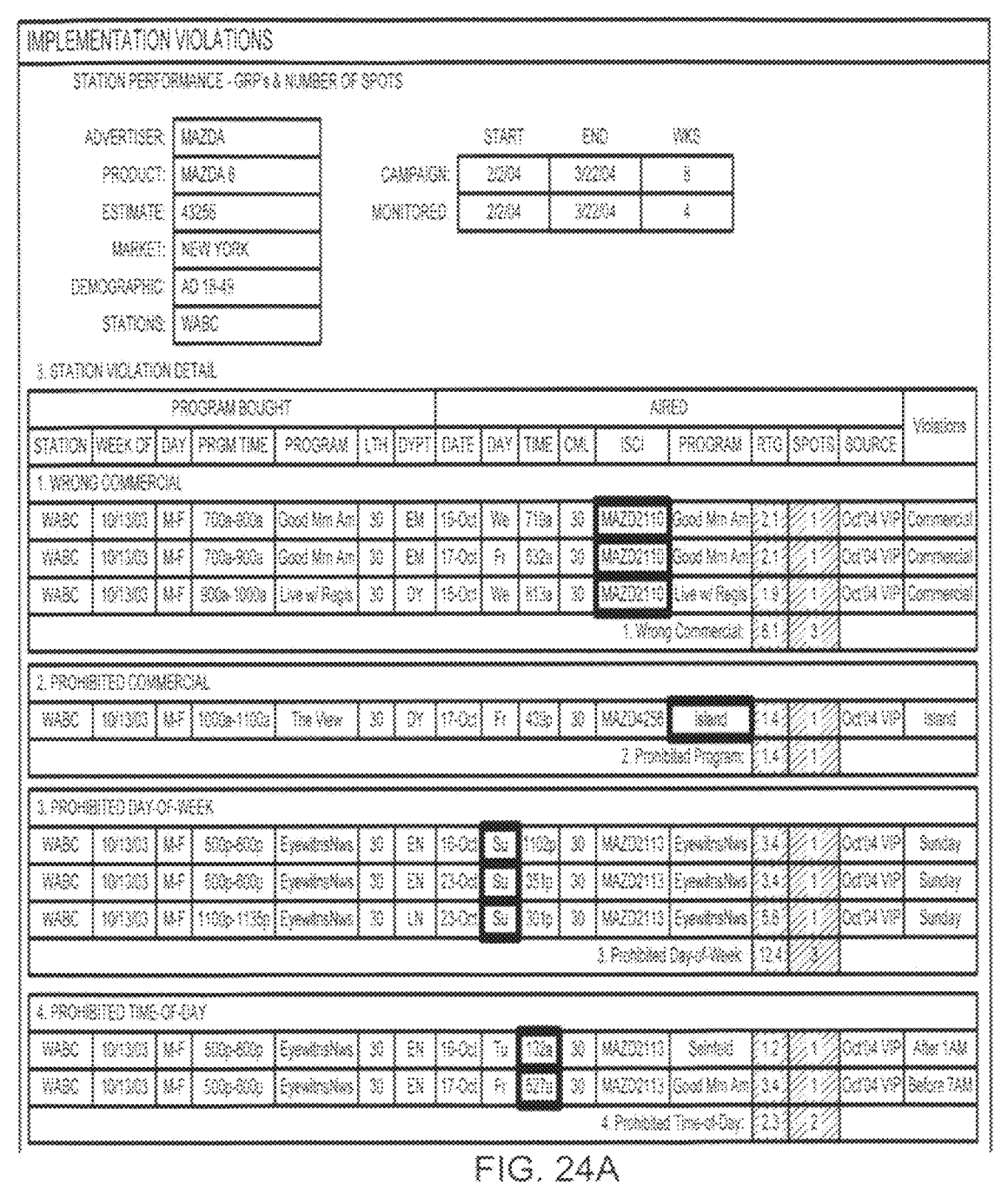
Figure 24B:
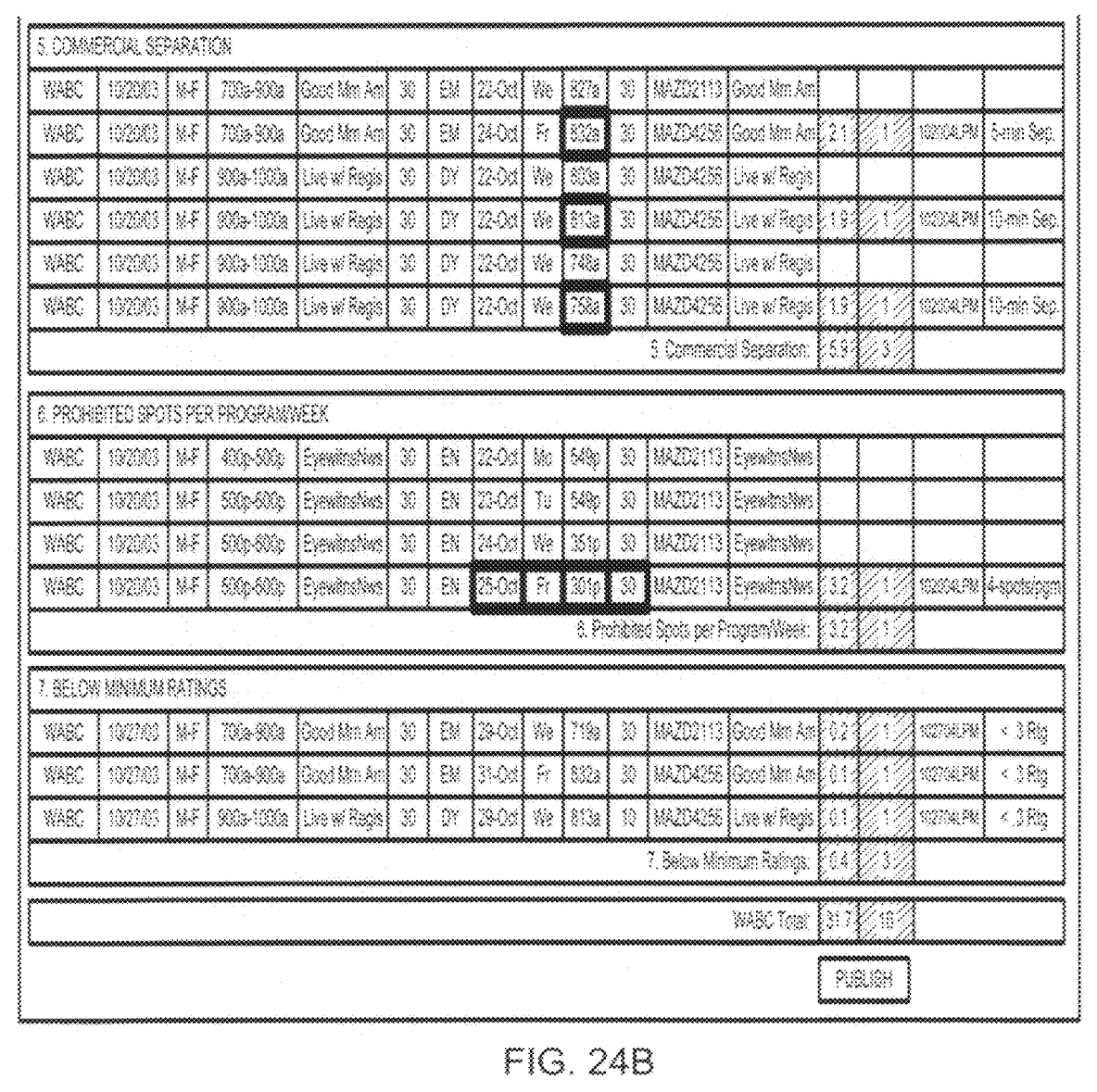

FIG. 24 is a station violation detail user interface screen to display detailed violation information associated with aired commercials. The station violation detail user interface screen may include a link to return the user to the user interface screen from which the user linked to the guidelines violation report default user interface screen.

Figure 25A:
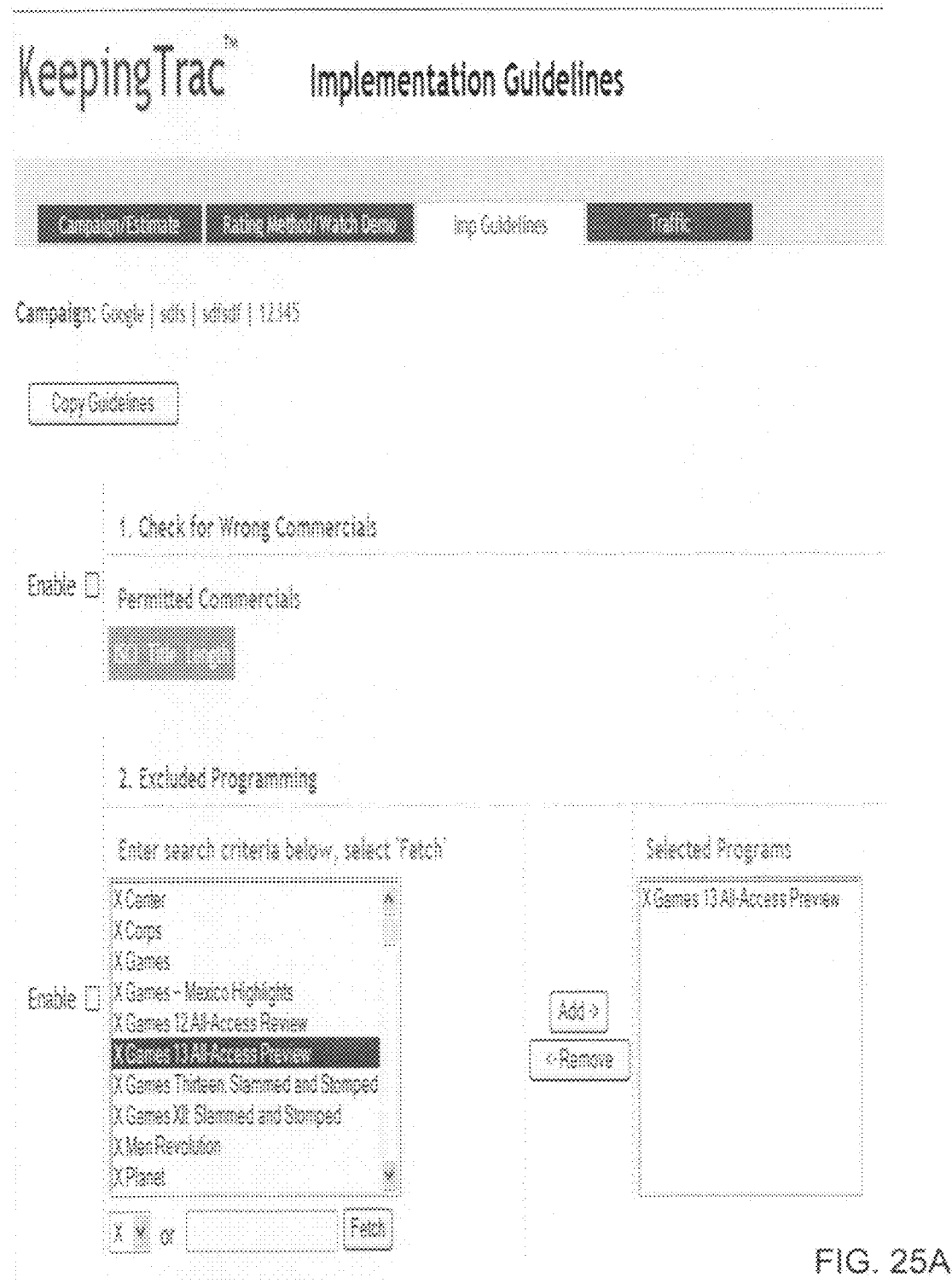
FIG. 25A is a first part of an implementation guidelines user interface screen to allow a user to configure the detection of violations of the guidelines specified in a buy.

FIG. 25 is an implementation guidelines user interface screen to allow a user to configure the detection of violations of the guidelines specified in a buy. Guideline verification allows a user (e.g., a buyer) to discern mid-buy whether a commercial occurrence should be considered part of the buy's fulfillment. Implementation guidelines of the illustrated example are rules concerning how commercials are to be aired. In the illustrated example, broadcasters are contractually obligated to follow guidelines specified in the buy. The guidelines input by the user in the implementation guidelines user interface screen are compared to the results of detections to determine if the airing of commercials complies with the guidelines.

For example, a guideline violation may occur when the wrong creative is detected for a commercial. In the illustrated example, the rating points associated with the wrong creative are tracked. The number of points required to meet the requirements of the buy are tracked.

Additionally, an example guideline violation occurs when a commercial is shown during excluded programming. For example, an advertiser may request that a commercial not be shown during a program that does not match the advertiser's desired demographic. In the illustrated example, users input the titles for programs that should be excluded. If the program during which the commercial was aired is on an excluded programs list, a guideline violation is reported.

Additionally, an example guideline violation occurs when a commercial is shown on the wrong day of the week.

Additionally, an example guideline violation occurs when commercials are not separated by a desired amount of time. In the illustrated example, a detection date and time for a commercial is compared with other detections for the same campaign to determine if a sufficient amount of time has passed. According to an example implementation, where a sufficient amount of time has not passed, ratings for the second occurrence are used for index calculation.

Additionally, an example guideline violation occurs when the maximum number of airings during a program has been reached for a commercial. For example, once a detection is matched to a campaign, the date, time, and program name are compared to previous detections to determine if a maximum number of spots designated in the buy has been reached.

Figure 26:
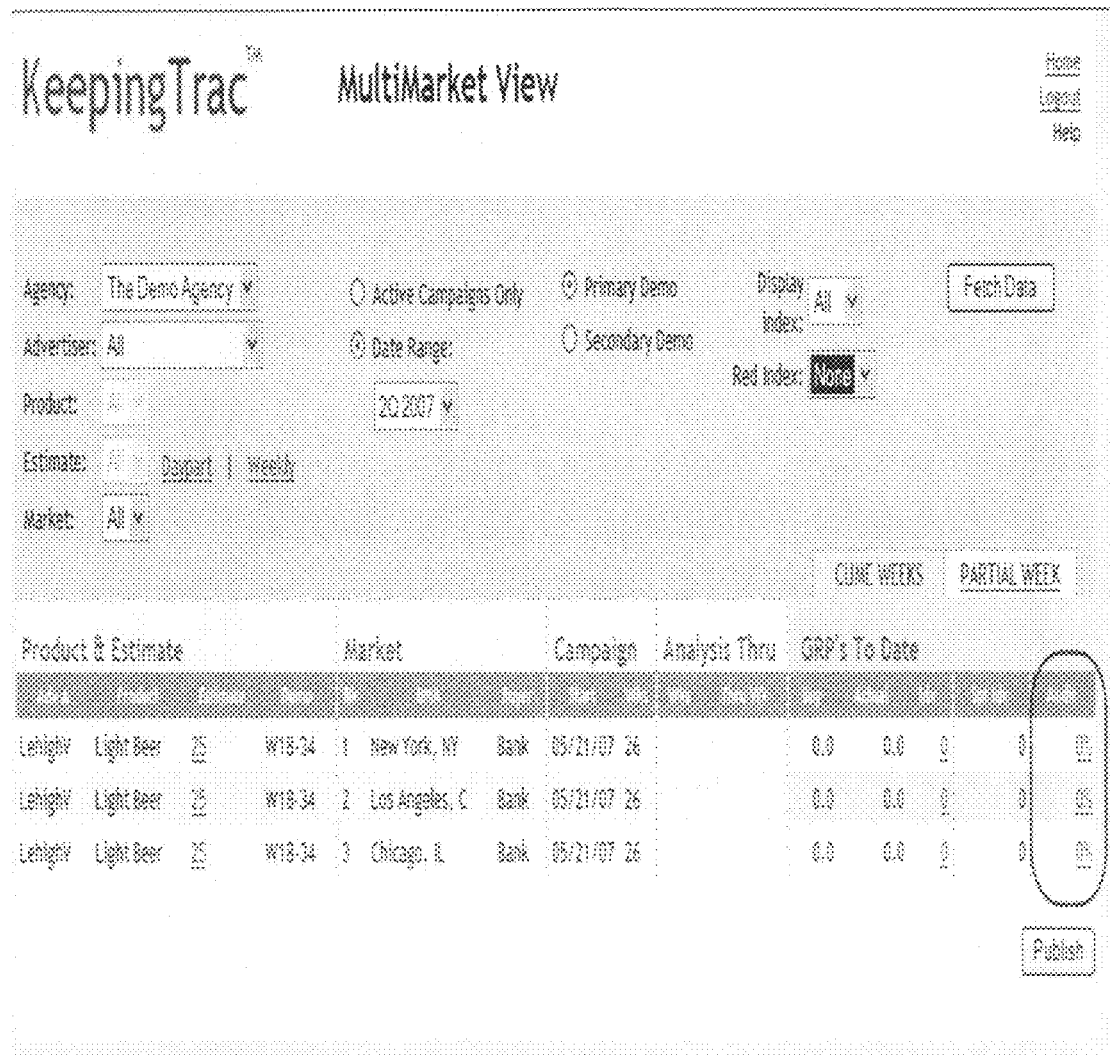
FIG. 26 is an example multi-market view user interface screen that includes an audit index.

FIG. 26 is an example multi-market view user interface screen that includes an audit index. The audit index identifies the percentage of reported GRPs that are attributed to commercials that violated implementation guidelines (e.g., the implementation guides specified in the implementation guidelines user interface screen of FIG. 25). The audit index value of the illustrated example is a hyperlink to a detail violations report (e.g., the violations report user interface screen of FIG. 27).

Figure 27:
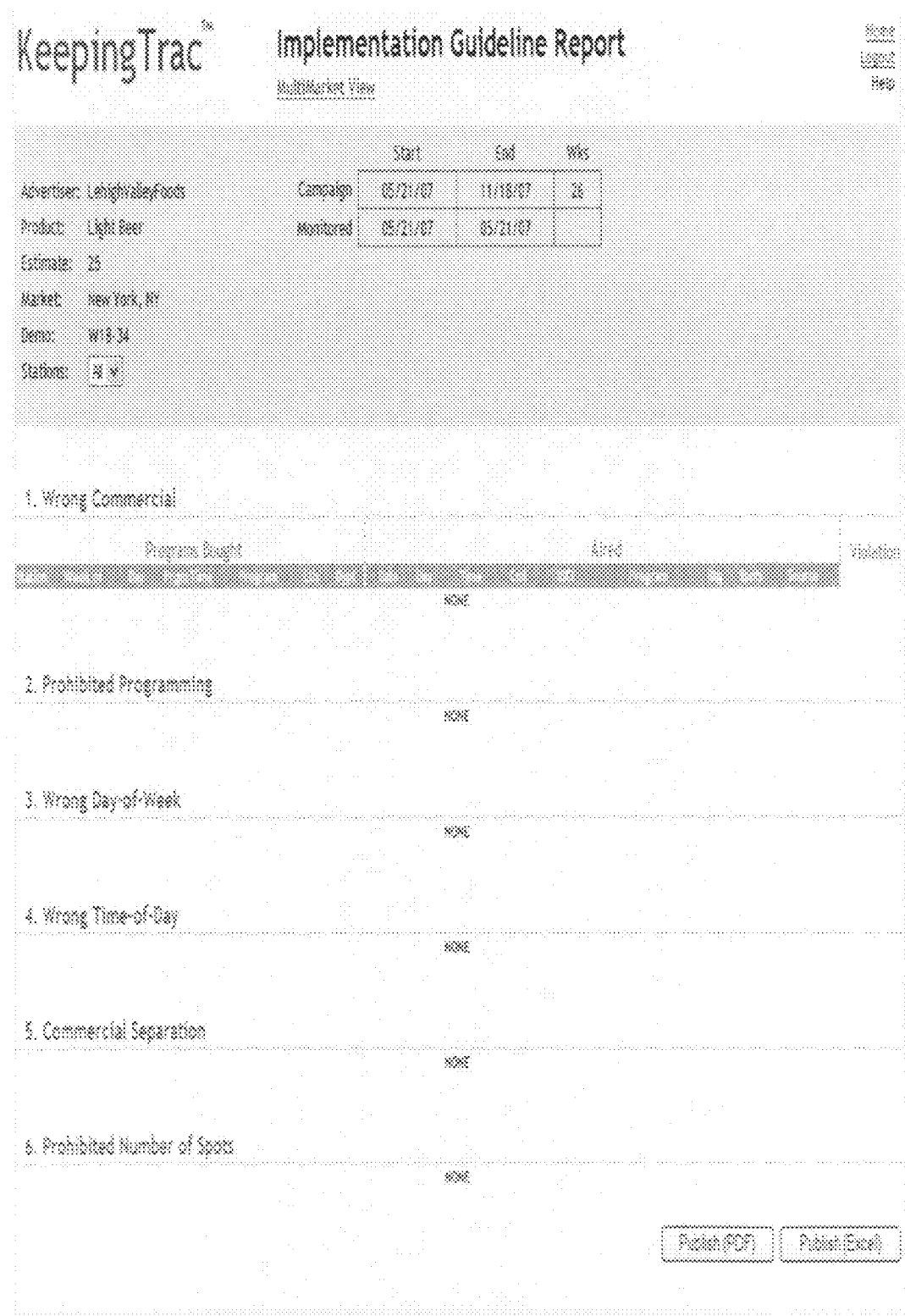
FIG. 27 is a violations report user interface screen that displays detailed information about guideline violations.

FIG. 27 is a violations report user interface screen that displays detailed information about guideline violations. In the illustrated example, every violation for a campaign is displayed under an applicable heading. According to the illustrated example, the complete detection record is displayed and violation elements are highlighted in red and ratings for the violating detection are highlighted in yellow.

Figure 28:
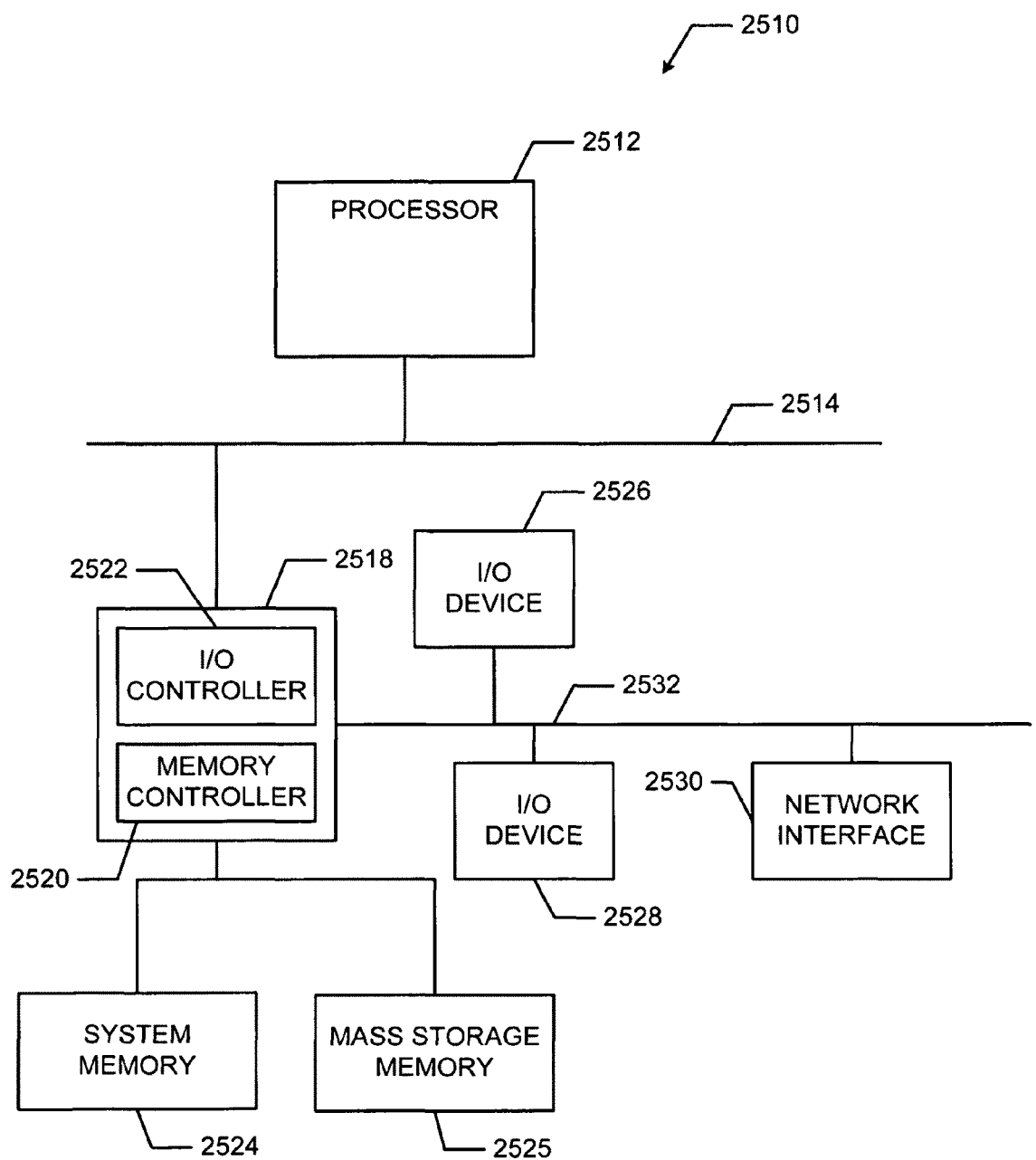
FIG. 28 is a block diagram of an example processor system that may be used to implement some or all of the example methods and apparatus described herein.
Figure 29:
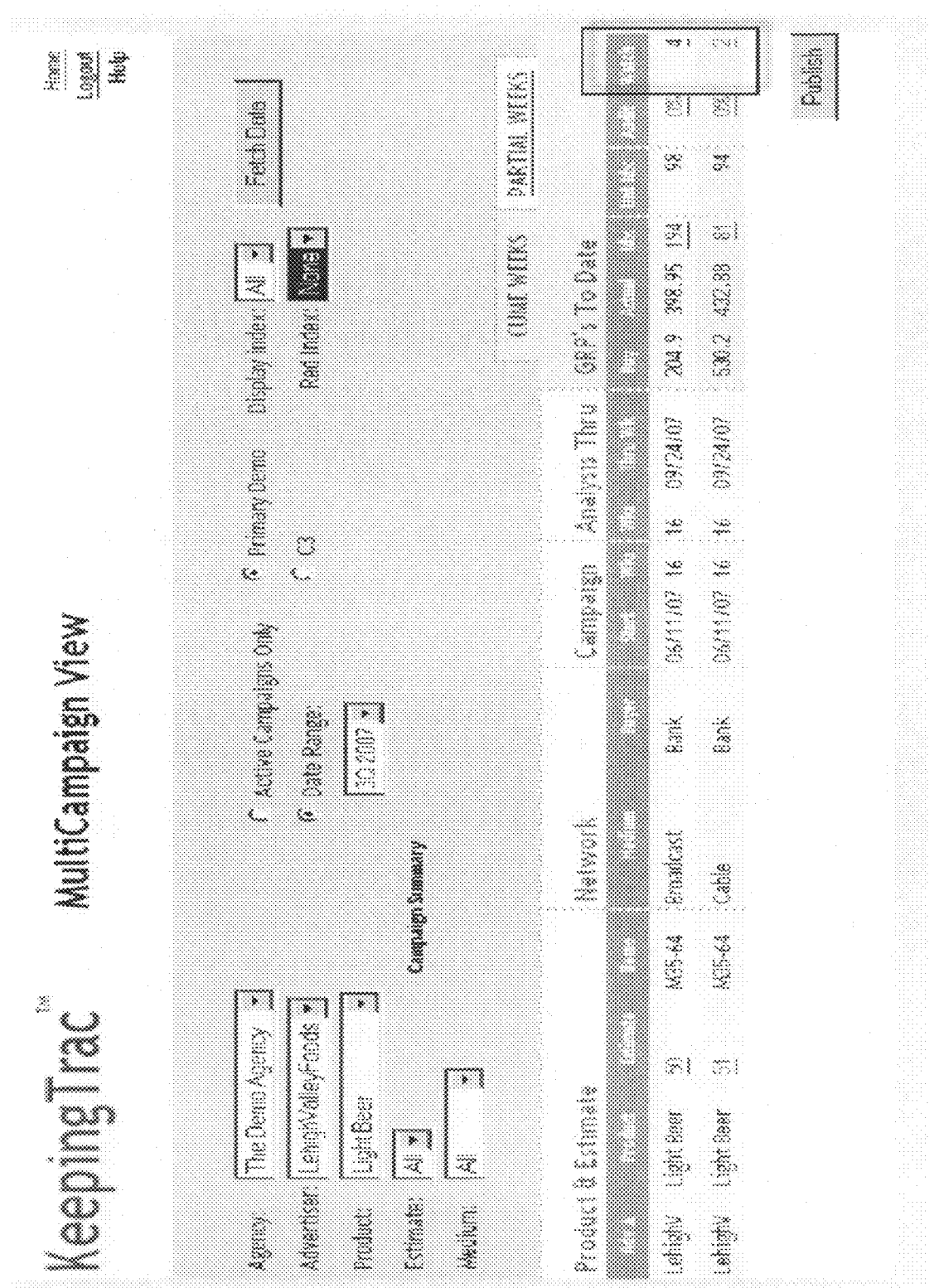
FIG. 29 is an implementation of report user interface for displaying information related to maximum exposure for aired commercials.
Figure 30:
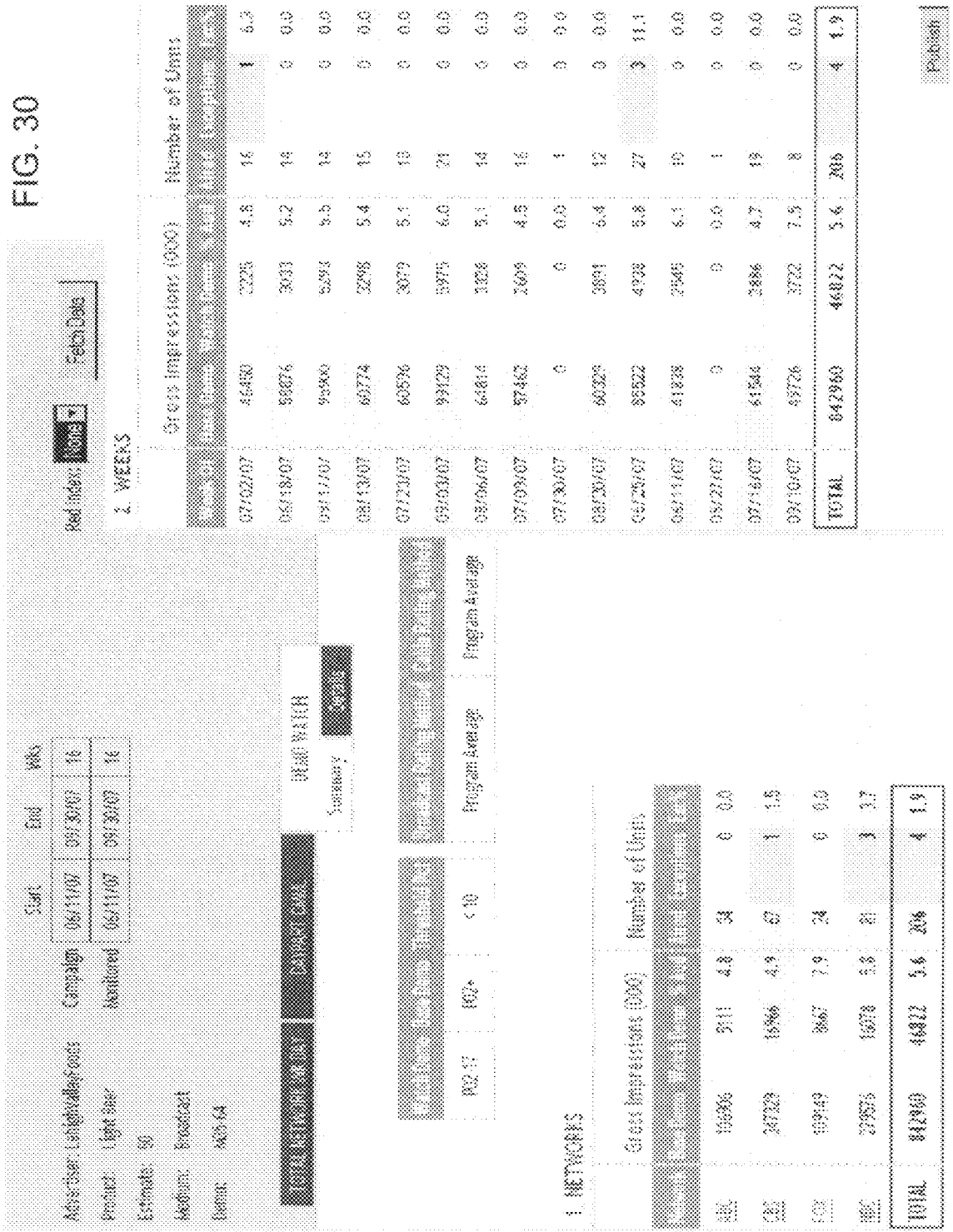
FIG. 30 is an implementation of report user interface for displaying information related to maximum exposure for aired commercials.
Figure 32:
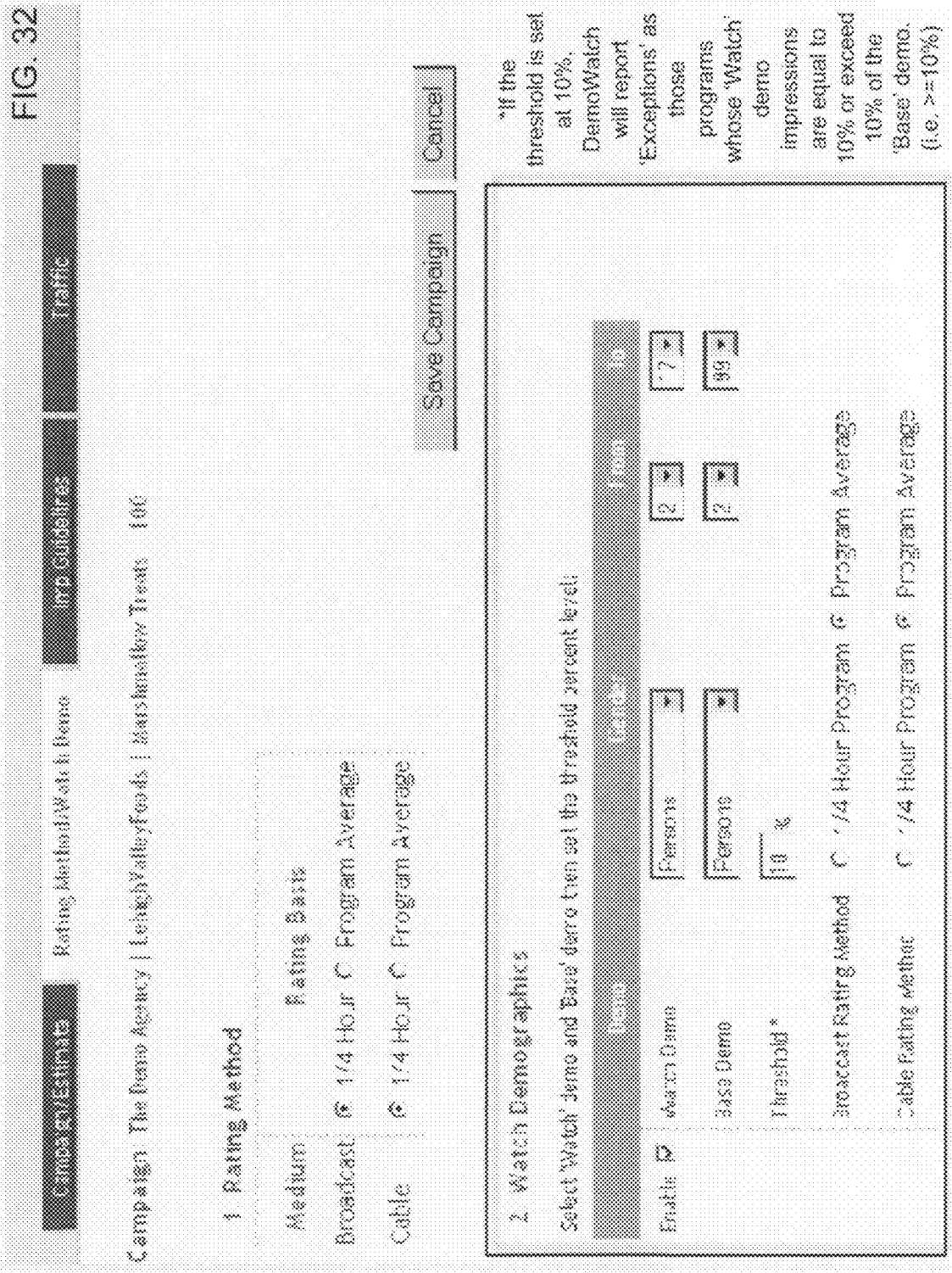
FIG. 32 is an implementation of report user interface for displaying information related to maximum exposure for aired commercials.

FIG. 28 is a block diagram of an example processor system 2810 that may be used to implement the apparatus and methods described herein. As shown in FIG. 28, the processor system 2810 includes a processor 2812 that is coupled to an interconnection bus 2814. The processor 2812 may be any suitable processor, processing unit or microprocessor. Although not shown in FIG. 28, the system 2810 may be a multi-processor system and, thus, may include one or more additional processors that are identical or similar to the processor 2812 and that are communicatively coupled to the interconnection bus 2814.

The processor 2812 of FIG. 28 is coupled to a chipset 2818, which includes a memory controller 2820 and an input/output (I/O) controller 2822. As is well known, a chipset typically provides I/O and memory management functions as well as a plurality of general purpose and/or special purpose registers, timers, etc. that are accessible or used by one or more processors coupled to the chipset 2818. The memory controller 2820 performs functions that enable the processor 2812 (or processors if there are multiple processors) to access a system memory 2824 and a mass storage memory 2825.

The system memory 2824 may include any desired type of volatile and/or non-volatile memory such as, for example, static random access memory (SRAM), dynamic random access memory (DRAM), flash memory, read-only memory (ROM), etc. The mass storage memory 2825 may include any desired type of mass storage device including hard disk drives, optical drives, tape storage devices, etc.

The I/O controller 2822 performs functions that enable the processor 2812 to communicate with peripheral input/output (I/O) devices 2826 and 2828 and a network interface 2830 via an I/O bus 2832. The I/O devices 2826 and 2828 may be any desired type of I/O device such as, for example, a keyboard, a video display or monitor, a mouse, etc. The network interface 2830 may be, for example, an Ethernet device, an asynchronous transfer mode (ATM) device, an 802.11 device, a DSL modem, a cable modem, a cellular modem, etc. that enables the processor system 2810 to communicate with another processor system.

While the memory controller 2820 and the I/O controller 2822 are depicted in FIG. 28 as separate functional blocks within the chipset 2818, the functions performed by these blocks may be integrated within a single semiconductor circuit or may be implemented using two or more separate integrated circuits.

FIGS. 25-28 illustrate example implementations of report user interfaces for displaying information related to maximum exposure for aired commercials. According to an example implementation, advertisers can request reports when a particular demographic exceeds a maximum threshold for percentage of viewing audience. For example, advertisers of pharmaceuticals, adult beverages, tobacco products, need to ensure that they are not advertising products to minors. Accordingly, an advertiser can request a watch to be placed on a particular demographic group (e.g., children ages 2-17). Companies can use reports to show statutory compliance and voluntary self-regulation. Other companies can use these reports to ensure they are delivering not only to their target audience, but also are not delivering a message to an undesired demo. For example, a company may have a female targeted creative it does not want to air to large male audiences, fearing the female targeted commercial may diminish the product brand to male consumers. An example process that may be implemented by software, hardware, and/or any combination of software and hardware, may include:

1. The User enables a campaign to include a DemoWatch report.
2. The user sets the watch demo.
3. The system collects detections of commercials for the campaign.
4. The system associates the detections with viewer impressions for both total viewers and the watch demo.
5. The system divides watch demo impressions by total viewer impressions to determine the percentage of watch demo that view the commercial occurrence.
6. If the demo watch viewership exceeds the threshold, the system records the occurrence as a demo watch violation.
7. The system reports all DemoWatch violations in online and digital download formats.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method for monitoring advertisements, the method comprising:
   receiving an identification of an advertisement that was presented on a media presentation channel during a time period;
   selecting a desired ratings provider for ratings information from a plurality of ratings providers;
   receiving the ratings information for the media presentation channel associated with the time period, the ratings information being representative of gross ratings points associated with the advertisement;
   identifying a buy order for the advertisement identified by the identification;
   receiving a purchased ratings value associated with the buy order, the purchased ratings value being representative of desired gross ratings points for the advertisement;
   comparing the purchased ratings value to the ratings information; and
   displaying an indication of whether the ratings information is less than the purchased ratings value.

2. A method as defined in claim 1, further comprising:
   determining a quarter-hour during which the advertisement was presented; and
   extracting an achieved ratings value associated with the determined quarter-hour from the ratings information.

3. A method as defined in claim 2, wherein comparing the purchased ratings value to the ratings information comprises comparing the purchased ratings value to the achieved ratings value.

4. A method as defined in claim 1, further comprising storing the ratings information, the purchased ratings value, and the indication in a database.

5. A method as defined in claim 1, further comprising:
  determining that data from the ratings provider is not available; and
  generating modeled ratings information for the ratings information.

6. A method as defined in claim 1, further comprising determining a market in which the advertisement was presented.

7. A method as defined in claim 6, wherein identifying the buy order for the advertisement includes identifying a buy order that identifies the determined market for the advertisement.

8. A system for monitoring advertisements, the system comprising:
  a performance verifier to receive an identification of an advertisement that was presented on a media presentation channel in a time period, receive ratings information for the media presentation channel associated with the time period from a ratings provider, the ratings information being representative of gross ratings points associated with the advertisement, identify a buy order for the received identification, receive a purchased ratings value associated with the buy order, and compare the purchased ratings value to the ratings information, the purchased ratings value being representative of desired gross ratings points for the advertisement; and
  a report generator to display an indication of whether the ratings information is less than the purchased ratings value,
  wherein the ratings provider is a first ratings provider and the system further includes a second ratings provider, wherein the performance verifier is further to select a desired ratings source from among the first ratings provider and the second ratings provider.

9. A system as defined in claim 8, wherein the performance verifier is further to:
  determine a quarter-hour during which the advertisement was presented; and
  extract an achieved gross ratings point value associated with the determined quarter-hour from the gross ratings point information.

10. A system as defined in claim 9, wherein the performance verifier is to compare the purchased gross ratings point value to the gross ratings point information by comparing the purchased ratings value to the achieved gross ratings point value.

11. A system as defined in claim 8, wherein the report generator is further to store the gross ratings point information, the purchased gross ratings point value, and the indication in a database.

12. A system as defined in claim 8, wherein the performance verifier is further to:
  determine that the ratings information is not available from the desired ratings source; and
  generate modeled ratings information for the ratings information.

13. A system as defined in claim 8, wherein the performance verifier is further to determine a market in which the advertisement was presented.

14. A system as defined in claim 13, wherein identifying the buy order for the received identification includes identifying a buy order that identifies the determined market for the advertisement.

15. A tangible machine readable storage device or storage disc comprising machine readable instructions that when executed cause a computer to at least:
  identify a buy order for a received identification of an advertisement that was presented on a media presentation channel during a time period;
  select a desired ratings provider for ratings information from a plurality of ratings providers, the ratings information representative of gross ratings points associated with the advertisement;
  compare a purchased ratings value associated with the buy order to the ratings information for the media presentation channel associated with the time period, the purchased ratings value being representative of a desired gross ratings point for the advertisement; and
  display an indication of whether the ratings information is less than the purchased ratings value.

16. A storage device or storage disc as defined in claim 15, wherein the machine readable instructions further cause the computer to at least:
  determine a quarter-hour during which the advertisement was presented; and
  extract an achieved ratings value associated with the determined quarter-hour from the ratings information.

17. A storage device or storage disc as defined in claim 16, wherein the instructions cause the computer to compare the purchased gross ratings point value to the gross ratings point information by comparing the purchased gross ratings point value to the achieved gross ratings point value.

18. A storage device or storage disc as defined in claim 15, wherein the machine readable instructions further cause the computer to store the gross ratings point information, the purchased gross ratings point value, and the indication in a database.

19. A storage device or storage disc as defined in claim 15, wherein the machine readable instructions further cause the computer to at least:
  determine that a ratings source is not available; and
  generate modeled ratings information for the ratings information.

20. A storage device or storage disc as defined in claim 15, wherein the machine readable instructions further cause the computer to determine a market in which the advertisement was presented.

21. A storage device or storage disc as defined in claim 20, wherein identifying the buy order for the received identification includes identifying a buy order that identifies the determined market for the advertisement.

* * * * *